United States Patent
Yamine et al.

(10) Patent No.: US 10,244,420 B2
(45) Date of Patent: Mar. 26, 2019

(54) WIRELESS DEVICE, NETWORK NODE AND METHODS PERFORMED THEREBY FOR REPORTING AND LOGGING AN EVENT

(71) Applicant: Telefonaktiebolaget LM Ericsson (publ), Stockholm (SE)

(72) Inventors: Badawi Yamine, Beirut (LB); Iana Siomina, Täby (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/549,501

(22) PCT Filed: Feb. 9, 2015

(86) PCT No.: PCT/SE2015/050145
§ 371 (c)(1),
(2) Date: Aug. 8, 2017

(87) PCT Pub. No.: WO2016/130053
PCT Pub. Date: Aug. 18, 2016

(65) Prior Publication Data
US 2018/0035322 A1   Feb. 1, 2018

(51) Int. Cl.
*H04W 24/08* (2009.01)
*H04W 24/10* (2009.01)
(Continued)

(52) U.S. Cl.
CPC ............ *H04W 24/10* (2013.01); *H04W 24/08* (2013.01); *H04W 64/00* (2013.01); *H04W 76/27* (2018.02)

(58) Field of Classification Search
None
See application file for complete search history.

(56) References Cited

U.S. PATENT DOCUMENTS

2011/0195668 A1   8/2011   Lee et al.
2012/0243418 A1*  9/2012   Ou ..................... H04W 24/10
                                                 370/241
(Continued)

FOREIGN PATENT DOCUMENTS

| EP | 2882210 A1 | 6/2015 |
|---|---|---|
| WO | 2012047070 A2 | 4/2012 |
| WO | 2014021463 A1 | 2/2014 |

OTHER PUBLICATIONS

3rd Generation Partnership Project, "Technical Specification Group Services and System Aspects; Functional stage 2 description of Location Services (LCS) (Release 11)", 3GPP TS 23.271 V112.0, Mar. 2013, pp. 1-169.
3rd Generation Partnership Project, "Technical Specification Group Radio Access Network; Evolved Universal Terrestrial Radio Access (E-UTRA); Radio Resource Control (RRC); Protocol specification (Release 11)", 3GPP TS 36.331 V11.6.0, Dec. 2013, pp. 1-349.
(Continued)

*Primary Examiner* — German Viana Di Prisco
(74) *Attorney, Agent, or Firm* — Sage Patent Group

(57) ABSTRACT

A wireless device and a method performed therefore are provided for reporting and logging an event, the wireless device being operable in a wireless communication network. The method comprises determining (110) that an event is to be logged and/or reported; and determining (120) if the location of the wireless device is a known location or is the same location as the last time the event was logged and/or reported. The method further comprises, when the location of the wireless device is a known location or the same location as the last time the event was logged and/or reported: logging (130) and reporting to a network node, according to an enhanced reporting and logging functionality.

32 Claims, 15 Drawing Sheets

(51) Int. Cl.
*H04W 64/00* (2009.01)
*H04W 76/27* (2018.01)

(56) References Cited

U.S. PATENT DOCUMENTS

| | | | |
|---|---|---|---|
| 2013/0190009 A1* | 7/2013 | Johansson | H04W 64/003 455/456.1 |
| 2013/0281063 A1 | 10/2013 | Jactat et al. | |
| 2014/0087716 A1* | 3/2014 | Vaderna | H04L 43/50 455/422.1 |
| 2014/0179345 A1 | 6/2014 | Gunnarsson et al. | |
| 2014/0206360 A1* | 7/2014 | Wegmann | H04W 24/04 455/440 |
| 2015/0223193 A1* | 8/2015 | Chang | H04W 16/18 455/456.2 |
| 2016/0088564 A1* | 3/2016 | Ahmadzadeh | H04W 52/0254 455/405 |
| 2018/0041912 A1* | 2/2018 | Futaki | H04W 64/006 |

OTHER PUBLICATIONS

3rd Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", 3GPP TS 37.320 V11.3.0, Mar. 2013, pp. 1-23.

3rd Generation Partnership Project, "Technical Specification Group Radio Access Network; Radio Resource Control (RRC); Protocol specification (Release 12)", 3GPP TS 25.331 V12.3.0, Sep. 2014, pp. 1-2204.

Office Action for European Application No. 15709774.2, dated Oct. 9, 2018, 8 pages.

3GPP, LTE; Evolved Universal Terrestrial Radio Access (E-UTRA); Radio Resource Control (RRC); Protocol specification; ETSI TS 136 331 v10.0.0. (Nov. 2011) (3GPP TS 36.331 version 10.0.0 Release 10); 281 pages.

* cited by examiner

WIRELESS DEVICE, NETWORK NODE AND METHODS PERFORMED THEREBY FOR REPORTING AND LOGGING AN EVENT

TECHNICAL FIELD

The present disclosure relates to wireless communication and in particular to reporting and logging of repeated events.

BACKGROUND

Performing drive tests in order to collect radio measurements in a wireless network is not only expensive and time consuming, it may also fail to reach all geographical areas in the network e.g. indoors. That is why Minimisation of Drive Tests, MDT, was introduced in $3^{rd}$ Generation Partnership Project, 3GPP. The objective is to configure the User Equipment, UE, to perform radio measurements, in idle or connected mode, and then report them to the network. Geographical position measurements are integral to this procedure since a main intention of MDT is to map the radio performance of a cellular network geographically. Hence MDT reports a geographical location together with radio conditions (e.g. reflected by UE measurements) that are related to this geographical position—otherwise MDT would be meaningless.

A plurality of methods and techniques exist to determine a position, or location, of a wireless device, e.g. a UE. Some examples are Cell ID positioning (CID), Enhanced Cell ID (E-CID), CID plus Timing Advance (TA), Time Of Arrival (TOA), Time Difference Of Arrival (TDOA), Observed TDOA (OTDOA), Global Position System (GPS), and fingerprinting positioning.

Radio signal strength and quality measurements comprise power-based radio signal measurements such as signal strength or quality that may be used for positioning to derive the distance, e.g. based on the pathloss estimation, or as Radio Frequency, RF fingerprints. This may be performed by wireless devices or radio nodes or a combination thereof.

Examples of timing measurements are time of arrival, round trip time (RTT), time difference of arrival, Rx-Tx, timing advance, and propagation delay. Timing measurements in general help to obtain more accurate distance information compared to distance estimation based e.g. on radio signal strength or pathloss measurements due to the fading fluctuations of the latter. Timing measurements are particularly common for positioning, although they may very well serve more general network purposes as well. Timing measurements may be performed by wireless devices or radio nodes or both, e.g. the later applies for two-direction measurements such as RTT.

The angle of arrival, AoA, measurement standardised for Long Term Evolution, LTE, is defined as the estimated angle of a UE with respect to a reference direction which is the geographical north, positive in the clockwise direction. This measurement may be performed by the eNodeB or the UE.

Generally, the positioning and MDT requirements cause a lot of activity at least for the wireless devices, but also for the network nodes. Determining the location, or position, as well as MDT measurements require substantial processing at the wireless device and also extensive signalling within the communication network. This in turn cost power for the wireless device resulting in shortened battery life and also substantial resource usage of the communication network.

SUMMARY

The object is to obviate at least some of the problems outlined above. In particular, it is an object to provide a wireless device, a network node as well as a respective method performed thereby for reporting and logging an event. These objects and others may be obtained by providing a wireless device and a network node and a respective method performed by the wireless device and the network node according to the independent claims attached below.

According to an aspect a method performed by a wireless device for reporting and logging of an event is provided. The wireless device is operable in a wireless communication network. The method comprises determining that an event is to be logged and/or reported; and determining if the location of the wireless device is a known location or is the same location as the last time the event was logged and/or reported. The method further comprises, when the location of the wireless device is a known location or the same location as the last time the event was logged and/or reported: logging and reporting to a network node, according to an enhanced reporting and logging functionality.

According to an aspect, a method performed by a network node is provided for reporting and logging of an event associated with a wireless device, the wireless device and the network node being operable in a wireless communication network. The method comprises receiving, from the wireless device, a report of the event according to an enhanced reporting and logging functionality; and forwarding the received report to an Operations Support System, OSS, or an evolved Serving Mobile Location Centre, eSMLC.

According to an aspect, a wireless device for reporting and logging an event is provided. The wireless device is operable in a wireless communication network. The wireless device is configured for determining that an event is to be logged and/or reported; and determining if the location of the wireless device is a known location or is the same location as the last time the event was logged and/or reported. The wireless device is further configured for, when the location of the wireless device is a known location or the same location as the last time the event was logged and/or reported: logging and reporting to a network node, according to an enhanced reporting and logging functionality.

According to an aspect, a network node is provided for reporting and logging of an event associated with a wireless device, the wireless device and the network node being operable in a wireless communication network. The network node is configured for receiving, from the wireless device, a report of the event according to an enhanced reporting and logging functionality; and forwarding the received report to an OSS or an eSMLC.

The wireless device, the network node and the respective method performed thereby may have several advantages. One possible advantage is that the battery life of the wireless device may be extended e.g. by not performing radio related measurements while residing at a known location or at the same location as the last time the event was logged and/or reported. In case the wireless device is in a known location, a GPS application of the wireless device may be switched off possible further extending battery life of the wireless device. By not performing any location reporting or reduced reporting according to the enhanced reporting and logging functionality in case the wireless device is still in the same location as previous reported one or a known location, the battery life of the wireless device may be further extended. Another possible advantage is that the signalling exchange in the network may be reduced. Yet a possible advantage is that establishing a temporary signalling channel used in order to exchange all messages in different signalling procedures used between UE & network may be avoided, due to the enhanced reporting and logging functionality. Still a possible advantage is that storage requirements in the node administrating MDT data may be reduced, again due to the enhanced reporting and logging functionality.

BRIEF DESCRIPTION OF DRAWINGS

Embodiments will now be described in more detail in relation to the accompanying drawings, in which.

DETAILED DESCRIPTION

Briefly described, a wireless device and a method performed there by for reporting and logging an event are provided. Further a network node and a method performed thereby for reporting and logging of an event associated with a wireless device are provided. By learning and remembering known locations and/or a last reported location when an event took place as the current location when the event is to be reported and logged anew, the wireless device may report and log according to an enhanced reporting and logging functionality. The enhanced reporting and logging functionality may comprise sending simplified or reduced information, retrieving last sent information in addition to performing new measurements or simply refrain from reporting and/or logging the latest event.

In this disclosure, the non-limiting term wireless device is used. It refers to any type of wireless device that communicates with a radio network node in a cellular or mobile communication system. Examples of a wireless device are a User Equipment, UE, target device, Device to Device, D2D, machine type UE or UE capable of Machine to Machine, M2M, communication, Personal Digital Assistant, PDA, iPAD, Tablet, mobile terminals, smart phone, Laptop Embedded Equipped, LEE, Laptop Mounted Equipment, LME, USB dongles, vehicles comprising means for communicating with e.g. network nodes etc.

Further, in this disclosure, the non-limiting term radio network node or simply network node is used. It refers to any type of network node that serves wireless devices and/or is connected to other network node(s) or network element(s) or any radio node from where the wireless device receives signal(s). Examples of network nodes are Node B, Base Station, BS, Multi-Standard Radio, MSR, node such as MSR BS, eNode B, eNB, network controller, Radio Network Controller, RNC, Base Station Controller, BSC, relay, donor node controlling relay, Base Transceiver Station, BTS, Access Point, AP, transmission points, transmission nodes, Remote Radio Unit, RRU, Remote Radio Head, RRH, nodes in Distributed Antenna System, DAS.

Figure 1A:
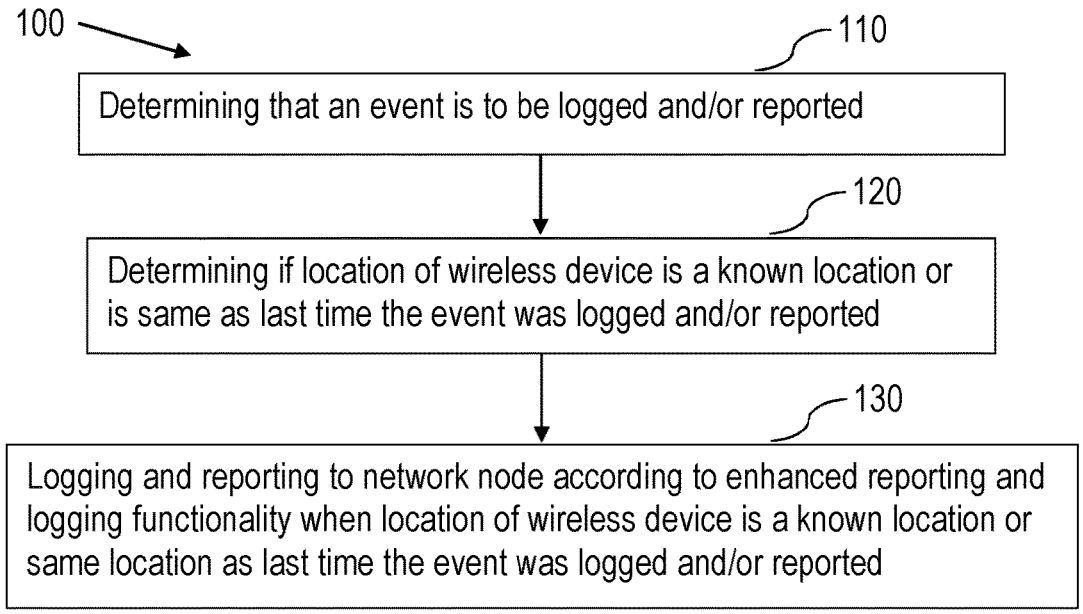
FIG. 1a is a flowchart of a method performed by a wireless device for reporting and logging an event, according to an exemplifying embodiment.

Embodiments herein relates to a method performed by a wireless device for reporting and logging an event, the wireless device being operable in a wireless communication network. Embodiments of the method will now be described with reference to FIGS. 1a-1g. FIG. 1a illustrates the method comprising determining 110 that an event is to be logged and/or reported; and determining 120 if the location of the wireless device is a known location or is the same location as the last time the event was logged and/or reported. The method further comprises, when the location of the wireless device is a known location or the same location as the last time the event was logged and/or reported: logging 130 and reporting to a network node, according to an enhanced reporting and logging functionality.

The wireless device may perform different tasks triggered by a request received from the network node or triggered by functionalities and/or procedure of the wireless device. Examples of different events are localisation of the wireless device, performing a variety of different measurements with regards to radio quality of links and channels, which in turn may be comprised in a Minimisation of Drive Test, MDT, configuration. Some events are performed more or less continuously, some are performed regularly at predetermined time intervals, some are performed when the wireless detects that a certain condition has changed etc.

Some, or most of, these different events may, or should, somehow be logged and/or reported to the network node. Thus, the wireless device determines that an event is to be logged and reported. The determination is done as described above, i.e. triggered either by a request received from the network node or by the wireless device itself.

The wireless device determines if it is in a known location or if it is in the same location as the last time the event was logged and/or reported. If that is the case, the location or position of the wireless device has not changed and most probably the radio conditions are not substantially different from the last time the event was logged and/or reported.

Merely as an example, determining that the wireless device is at the same location as the last time the event was logged and/or reported may comprise detecting, e.g. by means of a motion sensor of the wireless device, when the wireless device is moving away from the location the wireless device is in the last time the event was logged and/or reported or a known location. Thus, if the wireless device has not detected and/or recorded any movement since the last time the event was logged and/or reported, the wireless device knows that it is in the same location or in a known location without having to perform a full scale localisation procedure.

Consequently, instead of going through the whole procedure required by the event, which may comprise e.g. determining the geographical location of the wireless device and/or performing one or more radio measurements, the wireless device logs and reports according to the enhanced reporting and logging functionality. It shall be pointed out that in this disclosure, "logging and reporting" may sometimes be referred to as "reporting and logging" and vice versa. Likewise, "enhanced logging and reporting functionality" may be referred to as "enhanced reporting and logging functionality".

The enhanced reporting and logging functionality will be explained in more detail below.

The method performed by the wireless device may have several possible advantages. One possible advantage is that the battery life of the wireless device may be extended e.g. by not performing radio related measurements while residing at a known location or at the same location as the last time the event was logged and/or reported. In case the wireless device is in a known location, a GPS application of the wireless device may be switched off possible further extending battery life of the wireless device. By not performing any location reporting or reduced reporting according to the enhanced reporting and logging functionality in case the wireless device is still in the same location as previous reported one or a known location, the battery life of the wireless device may be further extended. Another possible advantage is that the signalling exchange in the network may be reduced. Yet a possible advantage is that establishing a temporary signalling channel used in order to exchange all messages in different signalling procedures used between UE & network may be avoided, due to the enhanced reporting and logging functionality. Still a possible advantage is that storage requirements in the node administrating MDT data may be reduced, again due to the enhanced reporting and logging functionality.

The enhanced reporting and logging functionality may comprise reporting and/or logging according to a short format; retrieving and reporting the same information as previously reported for the location of the wireless device without performing any new measurements and/or positioning; or refraining from reporting and/or logging the determined event.

The enhanced reporting and logging functionality may thus comprise different features. One example is reporting and/or logging according to a short format. The short format will be described in more detail below. Another example is that the wireless device retrieving and reporting the same information as previously reported for the location of the wireless device without performing any new measurements and/or positioning. This means that whenever the wireless device has performed the event, e.g. determining the location of the wireless device and/or performing various radio measurements, the wireless device may store the obtained information, e.g. in a memory within the wireless device. As will be described in more detail below, such stored data relating a location that is not a known location meaning that the wireless device does not "visit" that location frequently or regularly, will be deleted after a period in time in order to not overload the memory of the wireless device. Thus, if the wireless device is in a known location, is in the same location as when the event previously was logged and/or reported, or if the wireless device is at a location previously visited not too long ago, the enhanced reporting and logging functionality may comprise retrieving stored information relating to that event and reporting of the retrieved information.

Yet an example of the enhanced reporting and logging functionality is that the wireless device may refrain from reporting and/or logging the determined event. In case the event is triggered by any procedure or functionality of the wireless device, the wireless device may then simply refrain from reporting and/or logging the event. However, in case the event was triggered by a received request, the wireless device may need to send a response to the request, which then may be the retrieved information as described above.

In an example, the short format is at least one of a measurement ID or position ID for of a previously reported measurement or position.

Different known locations may be associated with respective different position IDs. In this manner, a known geographical location that may otherwise be reported by longitude and latitude or any other lengthy definition may be associated with a position ID. The position ID may be e.g. as "office1", office2", "home", "gym". The way a location may be a known location will be described in more detail below, but in brief can be said that a known location is a location where the wireless device is present for a certain duration of time, e.g. an hour or more; and/or a location that the wireless device re-visits regularly, e.g. at least once a week. The way this is determined will also be explained in more detail below.

Thus, when the wireless device determines that the event is to be logged and/or reported, and the event is one of e.g. determining and reporting the current location of the wireless device and/or current radio conditions (e.g. as a part of MDT), the wireless device may simply report with a position ID, wherein the network is informed, via the network node, that the wireless device is at e.g. "gym" where optionally the radio conditions have previously been reported and need not be reported again. It shall be pointed out that the position ID, e.g. "gym" reported by the wireless device is associated with the wireless device. In case another wireless device reports a position ID also named "gym", then that "gym" associated with that wireless device. Thus, two individual wireless devices may use the same position ID for a geographical position, but the actual geographical position is different since any position ID is associated with a wireless device. Consequently the position ID "X" associated with wireless device 1 may be different that the same position ID "X" associated with wireless device 2.

Figure 1B:
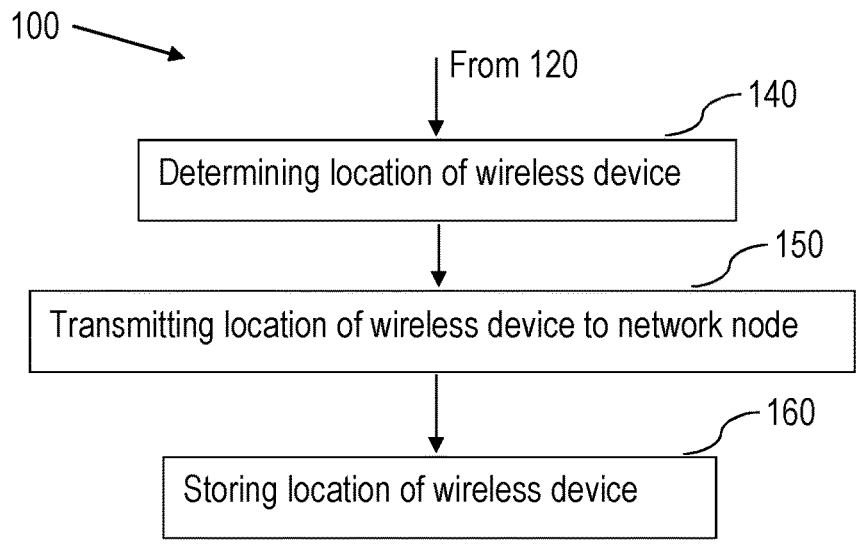
FIG. 1b is a flowchart of a method performed by a wireless device for reporting and logging an event, according to yet an exemplifying embodiment.

In an example, illustrated in FIG. 1b, when the location of the wireless device is not a known location or is not the same location as the last time the event was logged and/or reported, the method comprises determining 140 the location of the wireless device, transmitting 150 the location of the device to the network node, and storing 160 the location of the wireless device.

Since the wireless device is likely to move about, it may be at a location that is not a known location and it is not the same location as when the event last was triggered and possibly reported and/or logged. In such a situation, the wireless device determines the geographical location, and optionally also performs radio measurements if required, and transmits a report to the network node of at least the location and optionally also the measurement results if measurements were performed. The wireless device also stores the location and optionally also the measurements result if measurements are performed.

The wireless device may also save a time stamp with the stored information or associates the stored information with the time the information was obtained. If the same event is subsequently triggered once or more, within a time period of e.g. a week, two weeks, a month, wherein the wireless device is in that same location when the event is triggered again, the wireless device determines that this is now a known location and associates the known location with a position ID as described above.

On the other hand, if the same event is not triggered again at that location within that same time period, the wireless device deletes the stored information from its memory in order to not store unnecessary information.

Figure 1C:
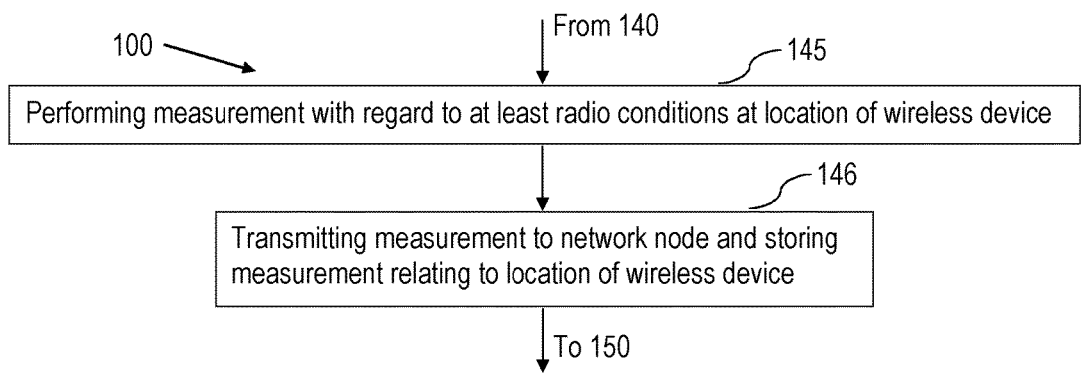
FIG. 1c is a flowchart of a method performed by a wireless device for reporting and logging an event, according to still an exemplifying embodiment.

The method may further comprise, as illustrated in FIG. 1c, performing 145 a measurement with regard to at least radio conditions at the location of the wireless device, transmitting 146 the measurement to the network node and storing the measurements relating to the location of the wireless device.

As described above, the event may be determining the current location of the wireless device and optionally also performing one or more measurements with regard to at least radio conditions at the location of the wireless device.

Thus, when the wireless device is at a "new" location when the event is triggered, the wireless device may determine both the location and perform the measurements at that location, wherein the wireless device subsequently reports the location and the result of the performed measurement(s). The wireless device also stores both the location and the measurement result for that location, in order to be able to retrieve the information e.g. in case the wireless device is subsequently requested, by the network node, to perform and report the event again and the wireless device is at the same location the next time the event is requested by the network node.

Figure 1D:
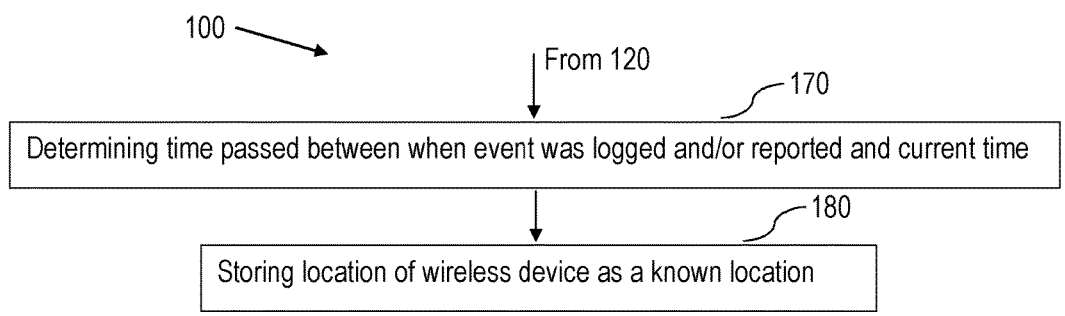
FIG. 1d is a flowchart of a method performed by a wireless device for reporting and logging an event, according to a further exemplifying embodiment.

According to an example, illustrated in FIG. 1d, when the location of the wireless device is not a known location but is the same location as the last time the event was logged and/or reported, the method further comprises determining 170 the time passed between when the event was logged and/or reported and current time, and when the time passed is longer than a predetermined time threshold, storing 180 the location of the wireless device as a known location.

By keeping track of the time period between two instances of when the event is triggered, i.e. the wireless device determines 110 that the event is to be logged and/or reported, the wireless device is enabled to determine if the current location shall henceforth be regarded as a known location. If the time period is a minute, then the current location may not be worthwhile to be regarded as a known location but if the time period is e.g. a couple of hours, the current location may be worthwhile to be regarded as a known location.

Not every location is a known location, a known location should be a location that is frequently visited and/or visited for relative long periods of time. Thus, the wireless device must have the means to determine when a location should be regarded as a known location, wherein the location may be associated with a position ID for that location.

Figure 1E:
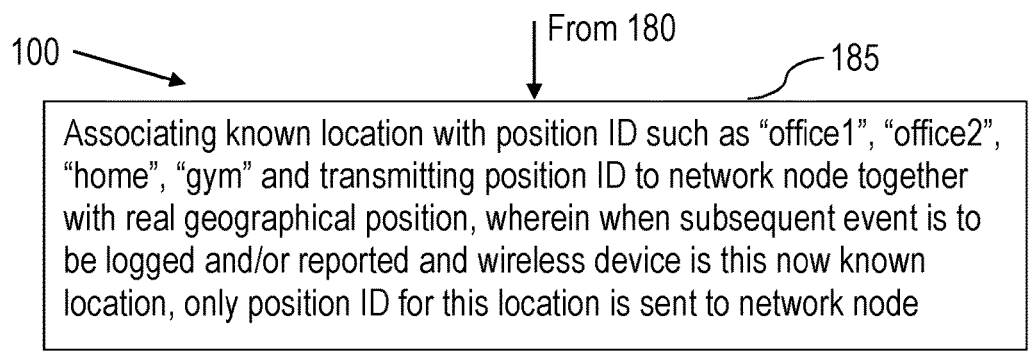
FIG. 1e is a flowchart of a method performed by a wireless device for reporting and logging an event, according to another exemplifying embodiment.

The method may further comprise, as illustrated in FIG. 1e, associating 185 the known location with a position ID such as "office1", office2", "home", "gym" and transmitting the position ID to the NETWORK NODE together with the real geographical location, wherein when a subsequent event is to be logged and/or reported and the wireless device is in this now known location, only the position ID for this location is sent to the network node.

As described above, the known location may be henceforth reported and/or logged whenever the event is triggered that the known location by means of a position ID for that known location. The position ID is typically in a shorter "format" than the geographical coordinates for that location. Hence, when the event comprises reporting and/or logging the current position of the wireless device, the wireless device may simply log and/or report the position ID of the known instead of the geographical coordinates for that location.

Figure 1F:
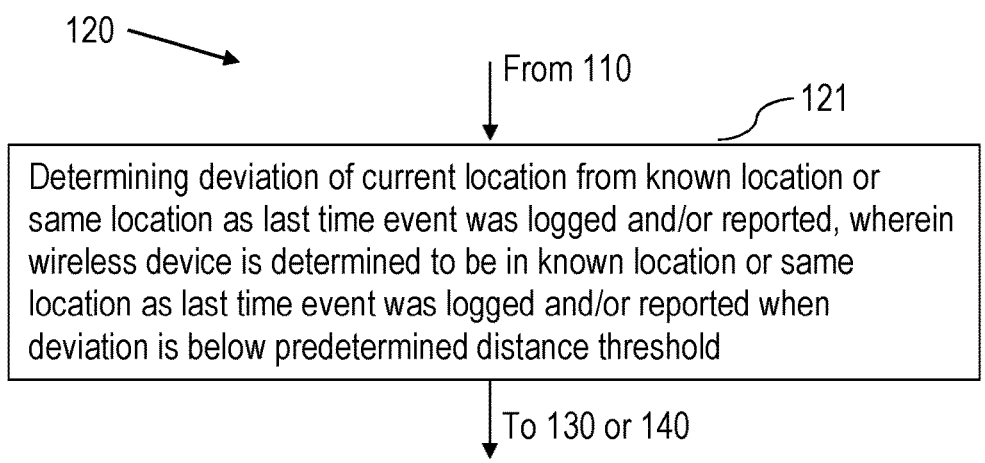
FIG. 1f is a flowchart of a method performed by a wireless device for reporting and logging an event, according to still an exemplifying embodiment.

According to another example, illustrated in FIG. 1f, determining 120 if the location of the wireless device is a known location or is the same location as the last time the event was logged and/or reported comprises determining 121 a deviation of the current location from a known location or the same location as the last time the event was logged and/or reported, wherein the wireless device is determined to be in a known location or the same location as the last time the event was logged and/or reported when the deviation is below a predetermined distance threshold.

The very exact geographical position may be determined with relatively good accuracy. However, in order to minimise the number of reports, logging etc., any known location should not be too restricted. For example, in any of the examples above, i.e. "office1", office2", "home", "gym", the user of the wireless device should be able to move about to some extent without deviating from the known location.

Also regarding radio conditions, e.g. in an office, the radio conditions may be quite similar within the office wherein there may be little need for the network (or a node comprised therein) to collect information for every definable location within the office.

Consequently, a known location may be defined as any position within a radius of a specific geographical location. The radius may correspond to the predetermined distance threshold, wherein the wireless device is considered to be at the known location when being within the radius defined by the distance threshold from a geographical location, which geographical location may be defined by its geographical coordinates.

According to yet an example, reporting a known location or the same location as the last time the event was logged and/or reported to the network node is performed by means of Radio Resource Control, RRC, signalling.

There are different signalling protocols that may be used between the wireless device and the network node depending on the technology the wireless communication network employs, e.g. for Global System for Mobile communications, GSM, Wideband Code Division Multiple Access, WCDMA, and LTE. In this example, the RRC protocol is used, which will be explained in more detail just below. In LTE, RRC is the protocol which is used between the wireless device and the network.

Generally, the RRC protocol is a layer 3 protocol and exists between the wireless device and the network node. It is part of the LTE air interface control plane.

According to a further example, the RRC signalling is the result of a RRC procedure wherein no additional signalling channel needs to be allocated for the RRC signalling.

Figure 6:
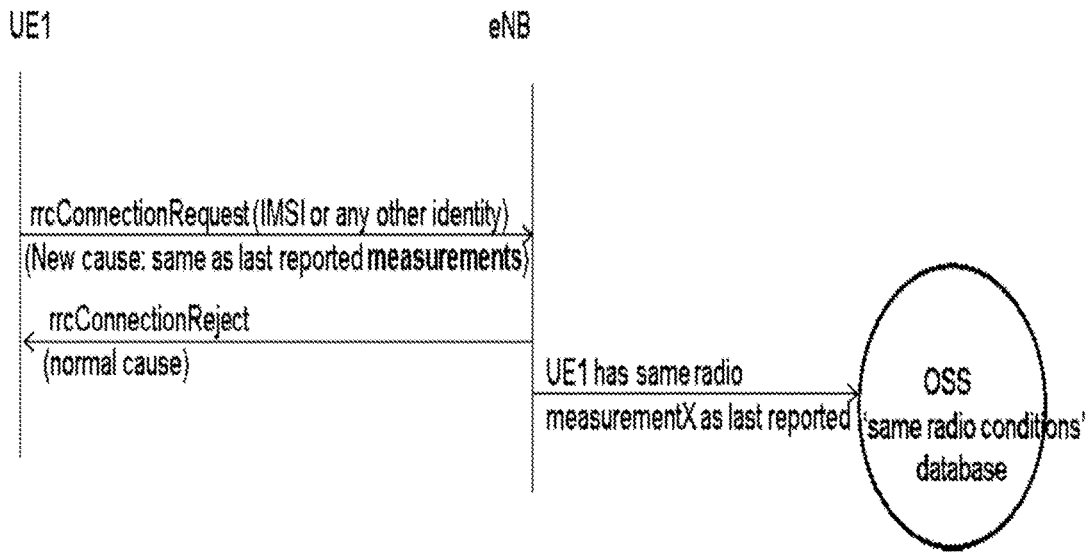
FIG. 6 is an exemplifying illustration of a modified Radio Resource Control, RRC, procedure used to report same radio measurements as last reported one.

The wireless device may send an RRC_ConnectionRequest to the network node, see also FIG. 6. The RRC_ConnectionRequest is associated with an identity of the wireless device e.g. International Mobile Subscriber Identity, IMSI and comprises a "cause", e.g. same as last reported measurements. The network node then responds by sending back a RRC_ConnectionReject with a case stating "normal".

Figure 1G:
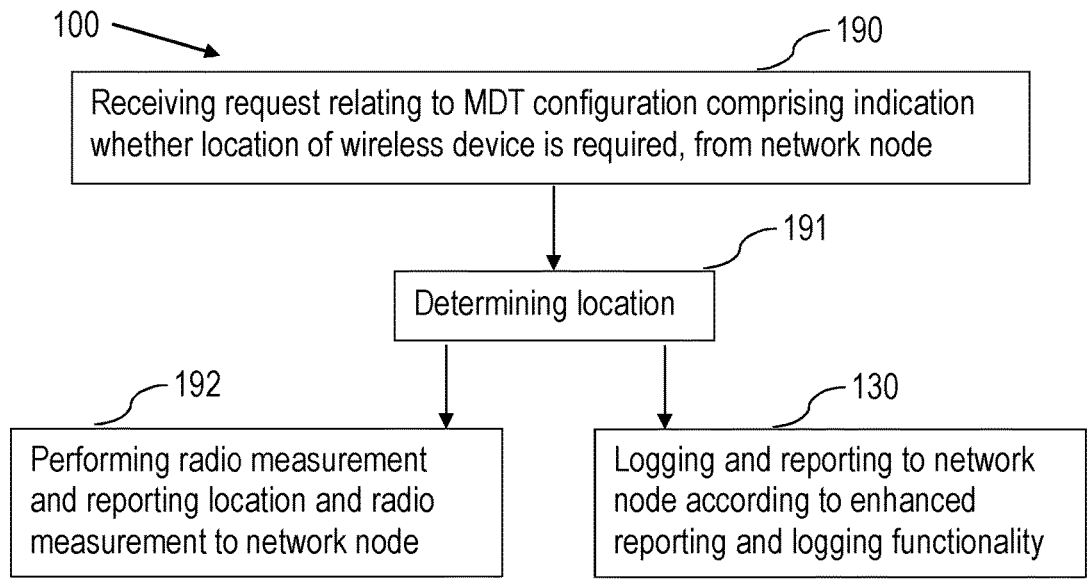
FIG. 1g is a flowchart of a method performed by a wireless device for reporting and logging an event, according to yet an exemplifying embodiment.

The method may further comprise, as illustrated in FIG. 1g, receiving 190, from the network node, a request relating to a Minimisation of Drive Tests, MDT, configuration or request comprising an indication whether location of the wireless device is required, wherein when the location of the wireless device is required, the method comprises determining 191 the location and (i) when the location is not a known location or the last reported location: performing 192 a radio measurement and reporting the location and radio measurement to the network node, (ii) when the location is a known location or the last reported location: logging 130 and reporting to the network node according to the enhanced reporting and logging functionality.

For some measurement events the operator might not be interested in knowing the location of the MDT measurement with high accuracy. However for some others e.g. a drop call occurrence, it might be interesting to have a better geographical accuracy on the location where the event has occurred. Hence MDT logging configuration messages may enhance the possibility of requiring a geographical location whenever a radio event occurs. In one example this could be done by inserting in the existing RRC LoggedMeasurementConfiguration an optional Information Element, IE, beside each radio event as shown below:

| Radioevent 1 | locationrequired (0 or 1) |
| Radioevent 2 | locationrequired (0 or 1) |
| ... | |
| Radioevent X | locationrequired (0 or 1) |

If locationrequired=0 then no geographical location is required and only the cell identity level is enough. However if locationrequired=1 that means that whenever a particular radio event is triggered a higher accuracy location of the wireless device at the time of the event is required. Note that the accuracy of that location might follow a specific location priority communicated to the wireless device via one dedicated signalling message or via system information. For example as a first priority the GPS method may be used, however if there is no GPS position available then another method e.g. OTDOA may be used as a second choice.

Embodiments herein also relate to a method performed by a network node for reporting and logging of an event associated with a wireless device, the wireless device and the network node being operable in a wireless communication network. Embodiments of the method performed by the network node will now be described with reference to FIGS. 2a-2c.

Figure 2A:
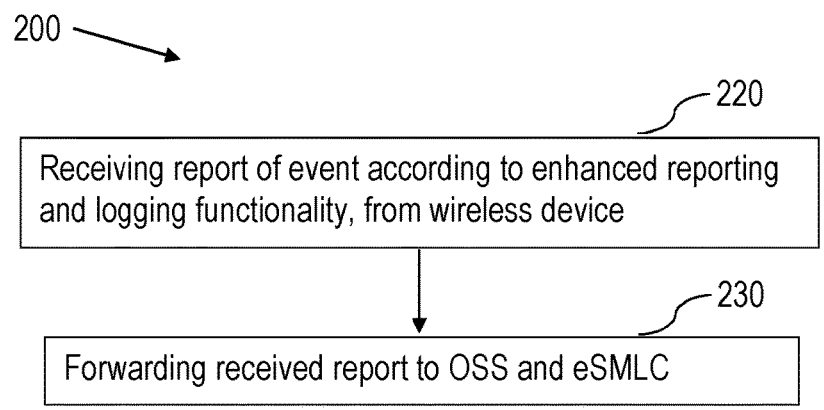
FIG. 2a is a flowchart of a method performed by a network node for reporting and logging of an event associated with a wireless device, according to an exemplifying embodiment.

FIG. 2a illustrates the method comprising receiving 220, from the wireless device, a report of the event according to an enhanced reporting and logging functionality; and forwarding 230 the received report to an Operations Support System, OSS, or an evolved Serving Mobile Location Centre, eSMLC.

The wireless device may send a report to the network node by means of the enhanced reporting and logging functionality. This means that the report comprises information associated with at least a current location of the wireless device being either a known location or being the same location the wireless device was in the last time the same event took place resulting in the report.

By receiving the report of the event according to the enhanced reporting and logging functionality, the network node is informed that it should forward the received report to the OSS or the eSMLC.

The method performed by the network node may have several possible advantages. One possible advantage is that the battery life of the wireless device may be extended e.g. by not performing radio related measurements while residing at a known location or at the same location as the last time the event was logged and/or reported. In case the wireless device is in a known location, a GPS application of the wireless device may be switched off possible further extending battery life of the wireless device. By not performing any location reporting or reduced reporting according to the enhanced reporting and logging functionality in case the wireless device is still in the same location as previous reported one or a known location, the battery life of the wireless device may be further extended. Another possible advantage is that the signalling exchange in the network may be reduced. Yet a possible advantage is that establishing a temporary signalling channel used in order to exchange all messages in different signalling procedures used between UE & network may be avoided, due to the enhanced reporting and logging functionality. Still a possible advantage is that storage requirements in the node administrating MDT data may be reduced, again due to the enhanced reporting and logging functionality.

Figure 2B:
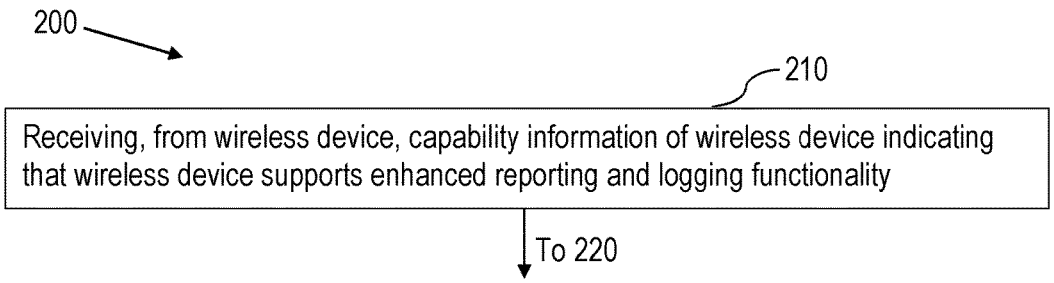
FIG. 2b is a flowchart of a method performed by a network node for reporting and logging of an event associated with a wireless device, according to yet an exemplifying embodiment.
Figure 2C:
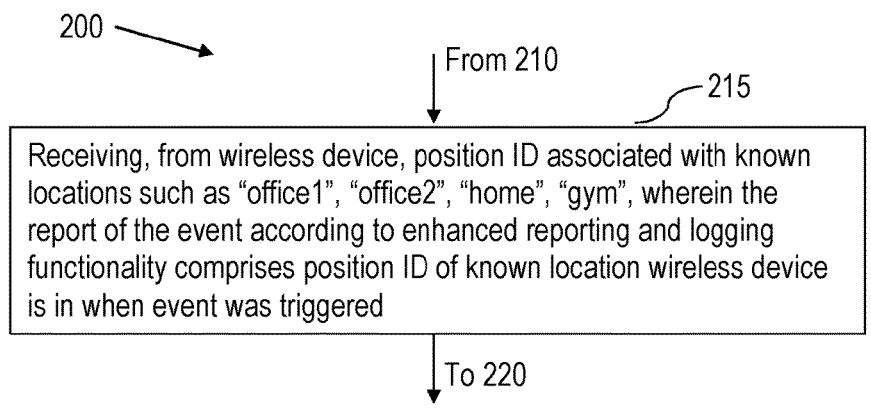
FIG. 2c is a flowchart of a method performed by a network node for reporting and logging of an event associated with a wireless device, according to still an exemplifying embodiment.

The method may further comprise, as illustrated in FIG. 2b, receiving 210, from the wireless device, capability information of the wireless device indicating that the wireless device supports enhanced reporting and logging functionality.

Some wireless devices may support the feature(s) of enhanced reporting and logging functionality and some may not. Depending on whether the wireless device supports the enhanced reporting and logging functionality, the network node has to take different actions. For example, for a wireless device not supporting the enhanced reporting and logging functionality, the network node has to perform MDT according to earlier standardised procedures.

Consequently, the network node should know whether the wireless device supports the enhanced reporting and logging functionality. By receiving the capability of the wireless device, the network node is informed of which features the wireless supports.

In an example, the report of the event is received by means of RRC signalling.

Figure 8A:
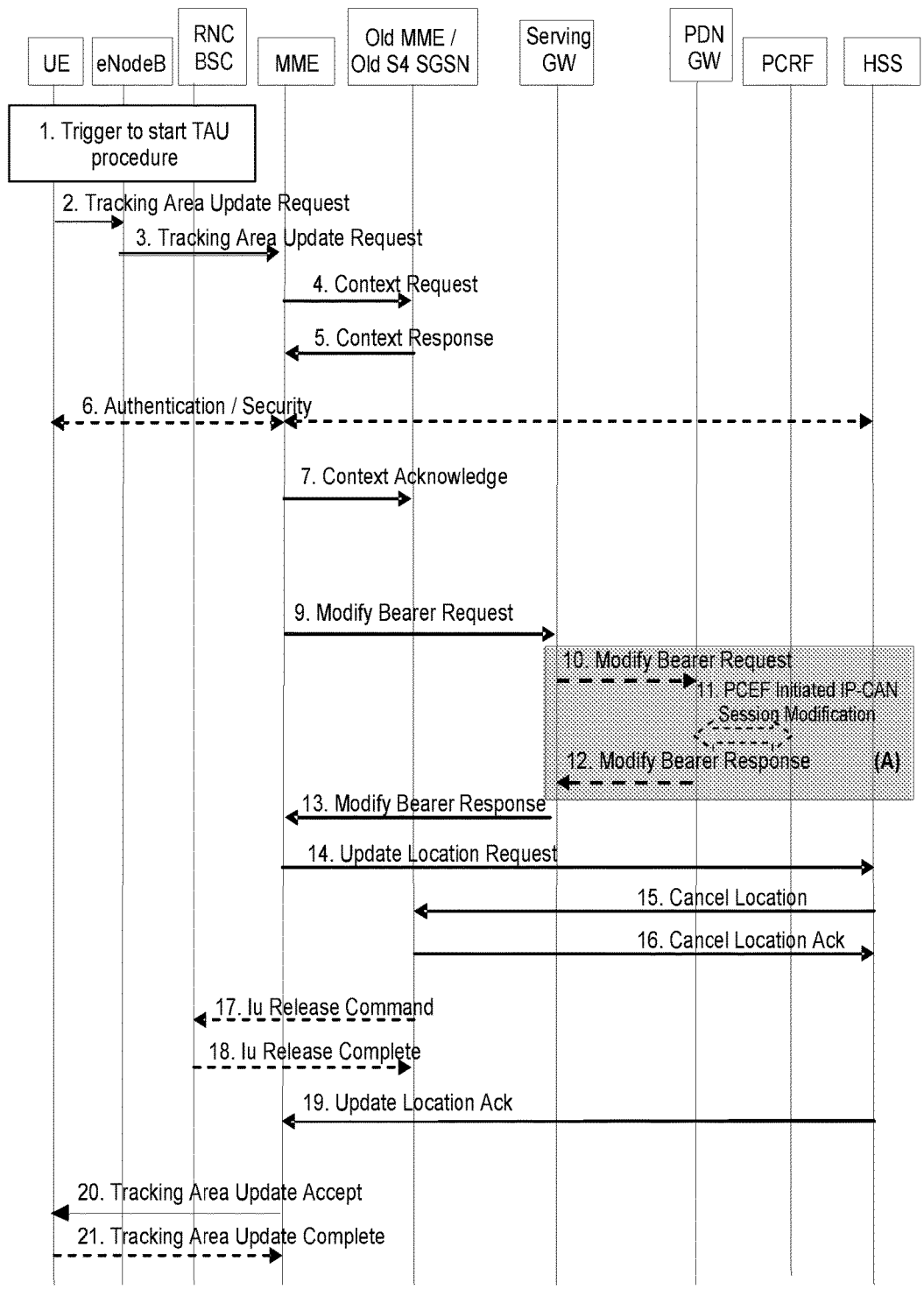
FIG. 8a is a signalling diagram illustrating an exemplifying Tracking Area Update, TAU, in E-UTRAN without a change of Serving Gateway, S-GW.
Figure 8B:
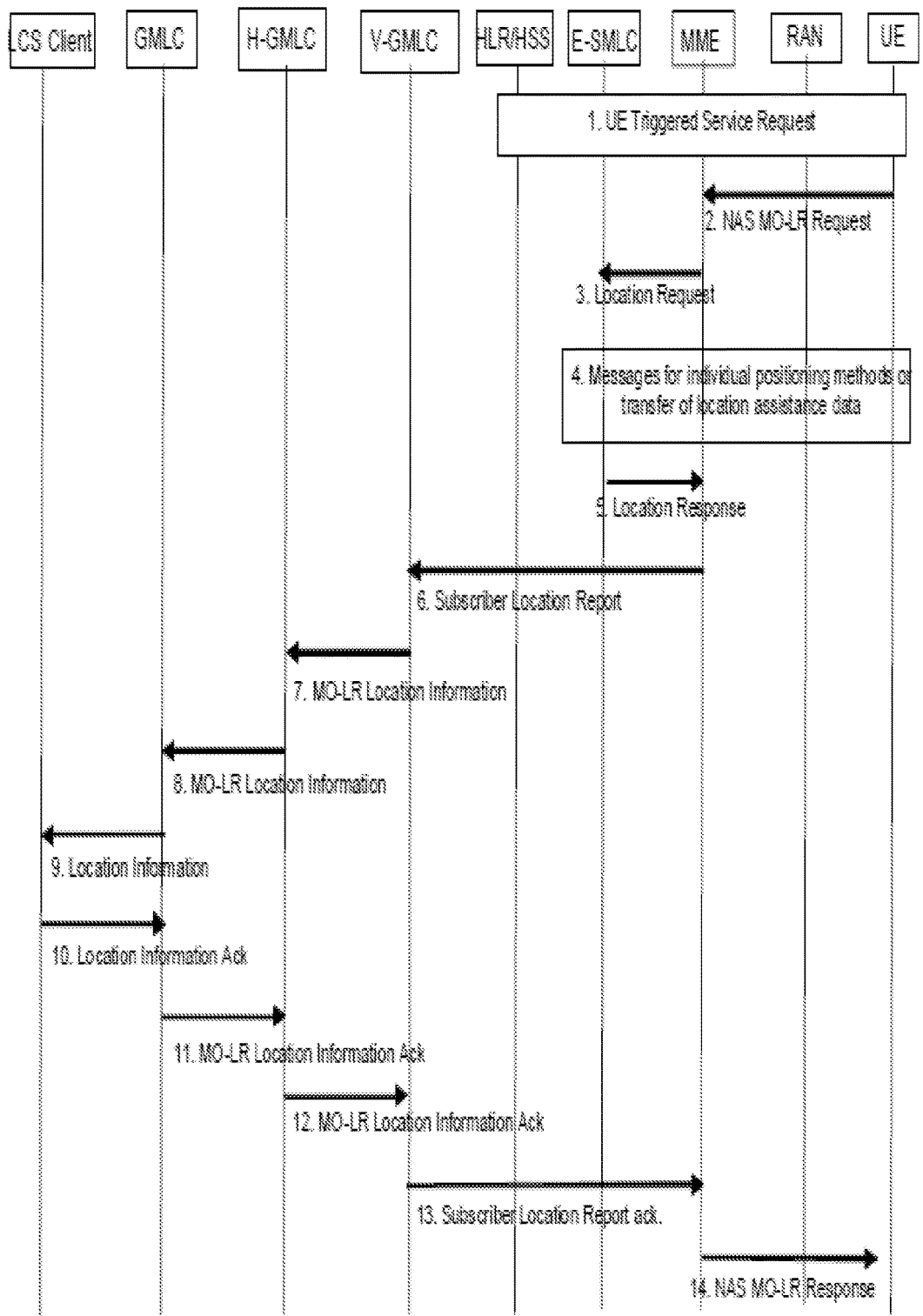
FIG. 8b is a signalling diagram illustrating Evolved packet Core Mobile Originated Location Request.
Figure 9:
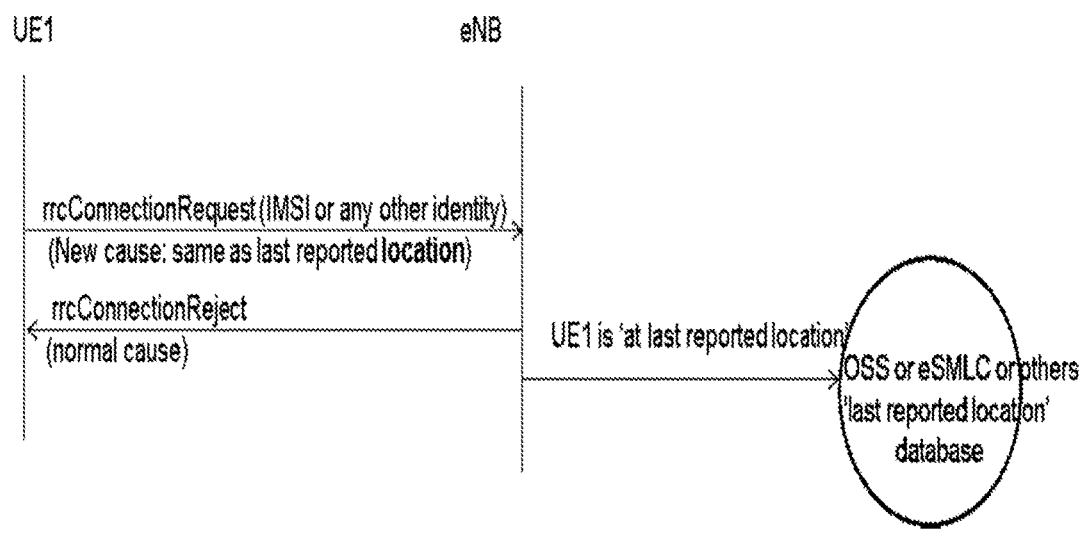
FIG. 9 is an exemplifying illustration of a modified RRC procedure used to report same previous "reported location".

As described above, there are different signalling protocol that may be used between the wireless device and the network node. In this example, the RRC protocol is used. By using a new modified RRC signalling procedure where only 2 RRC messages are used is illustrated in FIG. 9, the amount of signalling may be reduced. For reporting (e.g. forwarding) the same information in prior art, two signalling procedure are used, as shown in FIG. 8*a* and FIG. 8*b*.

In a further example, wherein the RRC signalling is the result of a RRC procedure wherein no additional signalling channel needs to be allocated for the RRC signalling.

Also as described above, with reference to FIG. 6, the wireless device may send a RRC_ConnectionRequest to the network node. The RRC_ConnectionRequest is associated with an identity of the wireless device e.g. International Mobile Subscriber Identity, IMSI and comprises a "cause", e.g. same as last reported measurements. The network node then responds by sending back a RRC_ConnectionReject with a case stating "normal".

In yet an example, when the network node forwards the received report to the eSMLC, the network node does so by means of a Long Term Evolution Positioning Protocol A, LPPa.

The LPPa is wireless device positioning protocol, LPPa, with terminations in the Evolved Universal Terrestrial Radio Access Network, E-UTRAN, and eSMLC that allows the exchange of information and measurements, which may be useful for some specific positioning methods. The LPPa may be used for delivery of timing information that is resident only to the E-UTRAN and/or is semi-dynamically changing, which is required for the Observed Time Difference Of Arrival, OTDOA, positioning method. Apart from this the LPPa may also support the exchange of E-UTRAN assisted measurements that are used for the Enhanced Cell ID positioning method.

Figure 10:
FIG. 10 is a signalling diagram illustrating an exemplifying signalling of an LLPa message used to transfer the information "as last reported location".

FIG. 10 illustrates a new LPPa message for the purpose of reporting an event according to the enhanced reporting and logging functionality. In this example the new LPPa message is denoted 'As last reported location' and it contains an identifier of the wireless device reporting the information about at least the current location of the wireless device.

Alternatively, the wireless device might transfer directly to the eSMLC an LPP message which contains the information of last reported location. For example the existing LPP message 'ProvideLocationInformation' could be used. If this alternative is used, then the wireless device needs to get connected to the core network, that is the wireless device has to be allocated a signalling channel in order to send the LPP message e.g. 'ProvideLocationInformation' via a Non Access Stratum, NAS, message. In such case the modified RRC procedure shown in FIG. 6 may not apply and another modified RRC procedure may be created for that purpose.

The method 200 may further comprise receiving 215, from the wireless device, position IDs associated with known locations such as "office1", office2", "home", "gym", wherein the report of the event according to the enhanced reporting and logging functionality comprises the position ID of the known location the wireless is in when the event was triggered.

The network node, and/or the OSS/eSMLC, needs to understand the position ID that the wireless device may transmit instead of the full geographical coordinates for the location it is in. Thus, once the wireless device has associated a known location with the corresponding position ID, the wireless device informs the network node about the position ID. The network node may forward also the position ID to the OSS and/or the eSMLC.

In the solution described above comprising the method performed by the wireless device and the network node respectively, logging and reporting of repeated events may be controlled, based on a similarity principle. The control comprises triggering positioning and radio measurements, the logging of the detailed location information and/or associated radio measurements, and efficient reporting of the corresponding logs, e.g. when the wireless device is residing in the same/close to known location or needs to log and/or report similar measurements.

As described above, the solution may enable saving the battery power in the wireless device, saving signalling resources in the network. The control comprises reducing efforts in the wireless device related to the logging of repeated events in the recognised locations and/or measurements that found to be similar (the level of similarity may also be controlled as described above). The reducing may be performed in such situations, e.g. always, selectively when a certain condition is met (e.g. the battery power is below a certain level), or when configured (e.g. pre-configured, configured by an application, or configured by another node), or by automatically discovering similarity with previous reported conditions.

Automatic detection of being in a similar location as before, and measuring similar radio conditions as before, is also a possibility.

Figure 3:
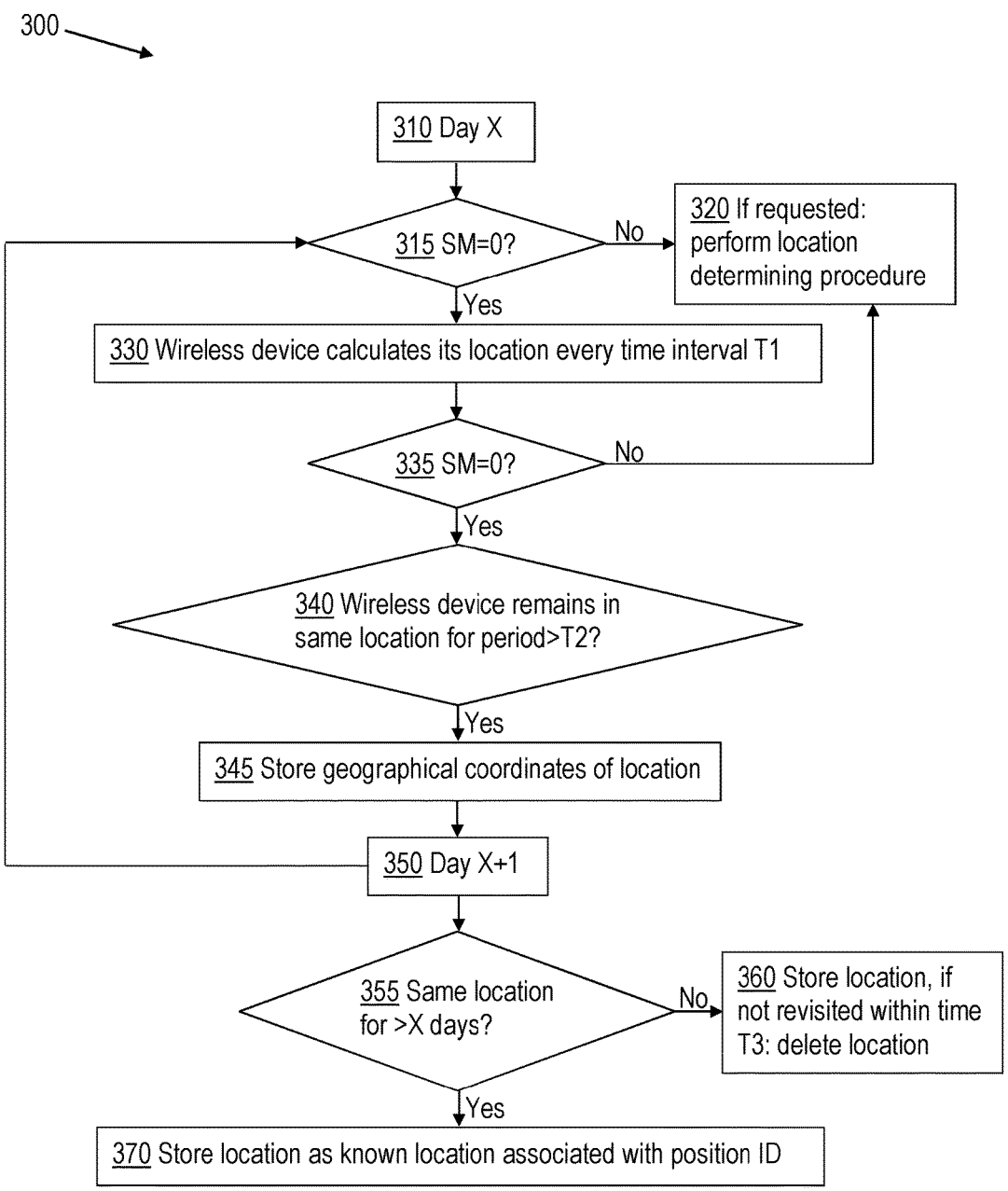
FIG. 3 is a flowchart of an example of a method performed by a wireless device for learning most visited locations.

FIG. 3 is a flowchart of an example of the wireless device learning most visited locations. The method for learning most visited location may comprise storing the information about at least one visited location.

The wireless device detects and stores at least one known location, a predefined number of the most visited areas and/or similar measurements associated with a location, etc. The information may comprise any one or more of: geographical coordinates in 2D or 3D, positioning measurements performed by the wireless device at this location, or a descriptive indicator of the location (e.g. 'home', 'office 1', etc.). The wireless device may also store the visiting statistics or information for one or more locations (e.g. how many times visited, timestamp, last time/day visited). The wireless device may store one or more locations; the locations to store may be, e.g. any location, a location selectively chosen by the wireless device, a location meeting one or more pre-defined or configurable criteria (e.g. accuracy, positioning method, etc.). The stored location may be stored for a certain period of time. The maximum number of stored locations may be pre-defined or configurable. The wireless device may store the information if it has spent at least a certain minimum amount of time at this location.

For this purpose, in one example, a new entity denoted 'learning historical locations of the wireless device is implemented at or in the wireless device. In order to learn the most visited locations of a wireless device and possibly the average duration of wireless device presence in those locations, in one example that entity will regularly check the location of the wireless device for specified periods of time. The same procedure is repeated the next day and so on till end of the week. As a result of that procedure the new entity will build a database of the 'most visited locations' and of the period of time the wireless device stays in those locations. After that 'most visited location(s)' is reported, at least once, to the network, then in this disclosure its name becomes 'known reported location'.

Yet another function of that entity is to name and tag each 'most visited location' and 'known reported location' where each name/tag corresponds to one 3-dimensional or 2-dimensional geographical location. If a known reported location is not re-visited by the wireless device for a relatively long period of time, then that location is removed from the database or memory of the wireless device.

In an example, a new entity called Sensor Motion, SM, may be introduced. The SM may be a new software and/or hardware entity that is installed in the wireless device. It has two main functions:
1. The first function is to detect if the wireless device is moving away from a 'known reported location within a defined radius'.
2. The second function is to detect if the wireless device is moving away from the last reported location. This is useful when the wireless device is moving on a road.

A flag denoted SM may be used and it is coded as 1 bit. The value of that bit is set to 0 if the wireless device is not moving (or it is moving at a very low speed) whereas it is set to 1 when the wireless device is moving.

In yet another example the triggering is based also on the speed of the wireless device which may be based on GPS. In the following sections and for simplicity the SM method is described without speed augmentation, however speed may be used whenever GPS coverage is available and when there is no concern about the battery consumption of the wireless device.

The SM may be turned on by the wireless device when required, and the SM is only triggered when needed. In an example the SM is turned on when an MDT log is requested by the wireless device. In another example the SM is turned on when a periodical location reporting is triggered.

In the flowchart of FIG. 3, all parameters listed in the flowchart (that are required for the wireless device to estimate the most visited location e.g. the number of days for monitoring) could be communicated to the wireless device via a dedicated message e.g. via RRC LoggedMeasurement-Configuration or via any other message.

Any new location request of the wireless device may be evaluated with respect to either an already 'known reported location' and/or associated measurements or with the last reported location and/or associated measurements in order to determine/discover the degree of similarity and recognise already reported location/measurements.

In an example, in case it is determined that the wireless device is in the same location as one of the known reported locations, the wireless device does not trigger any new location related measurements, calculations or reporting of a new position.

In another example, the discovery mechanism of the wireless device is enhanced to also be responsive to the measured radio conditions. Thereby radio conditions in a location that do not differ much as compared to previous reports may not be reported or reported with a repeat message containing a measurement ID of a previously reported measurement, the previous reported location, or another measure that avoids signalling of the complete set of measurements.

In yet another example, for determining the similarity, a sensor motion or any other device or method e.g. speed of wireless device based on GPS measurements, together with a certain predefined radius, may also be used in order to estimate if the wireless device has moved far away from its last reported location.

A new parameter denoted 'within the same area' as last reported location may be introduced. The value of that parameter may be communicated via dedicated signalling e.g. that parameter might be used as an optional IE in an RRC_LoggedMeasurementConfiguration message or by any other means.

Figure 4:
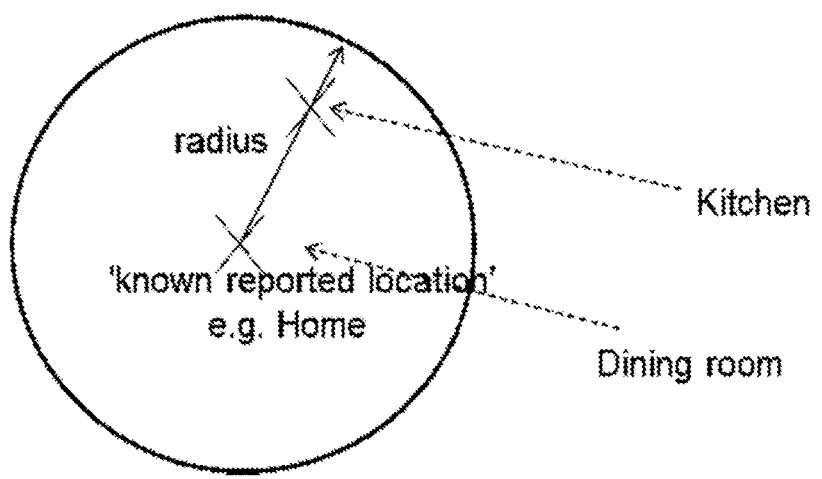
FIG. 4 is an illustration of a predefined radius that defines an area around a geographical location to be e.g. a known location.

That parameter is typically measured in meters. Suppose that the defined radius is 20 meters, then as long as the wireless device estimates that it is located in one of the 'most visited location' within a radius of 20 meters it will be considered as if it is in the same location. In that case a 'known reported location' is renamed as a 'known reported location within a defined radius' as shown in FIG. 4. This new name is given just to tell the location requester that the accuracy in comparison to the last reported location is within that new parameter range.

In one example, by using its GPS device, the wireless device continuously compares its actual location with all last stored 'known reported location'. An organization of the information in a properly searchable data structure would ensure a quick lookup. Once the wireless device actual location matches one of these 'known reported location' it is then sure it is in the area of one of its own 'known reported location'. On the other hand, at any location outside a 'known reported location', e.g. the subscriber is on the beach, the wireless device always compares any new location request with the last reported location, to know if it is 'within the same area' of the last reported location.

The wireless device might not have a GPS device installed, or the subscriber might have the GPS turned off, in such situations the wireless device might use other methods to recognize one 'known reported location'. In fact, for recognizing the location, it may not be necessary to trigger a positioning procedure specifically to obtain the wireless device location, e.g. the location may become evident from continuous wireless device tracking, observed measurement patterns, etc. The location may be fully recognised (i.e. the location is the same) or partly recognised (i.e. the location is similar but possibly not exactly the same, e.g. same building but not the same floor). The wireless device may also recognise the location, e.g. by comparing any one or more of: the measurements, coordinates, address or floor (e.g. considered the same if the difference is below a threshold, wherein the thresholds or the admissible accuracy of the recognition may be pre-defined or configurable).

Figure 5:
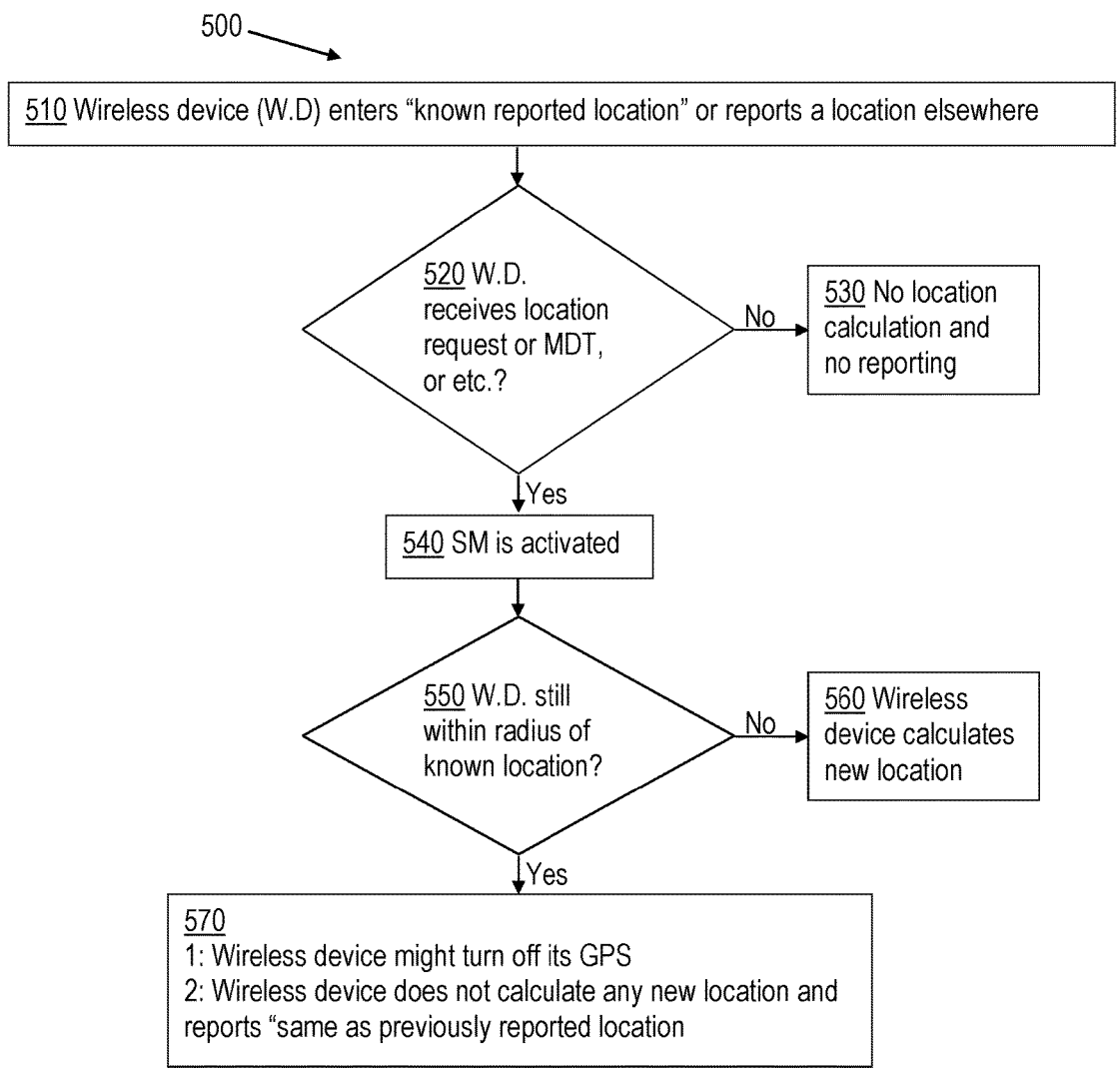
FIG. 5 is a flowchart illustrating an example of actions taken by a wireless device when in a known location.

As shown in FIG. 5, as long as the wireless device is 'within the same area' of a 'known reported location' or of a 'last reported location' then it does not perform any positioning calculation after any new location request. Also it might turn off the GPS device in order to save wireless device battery consumption.

As described above, the solution for location reporting may be applied not only to location reporting but also to measurement reporting e.g. for MDT or other purpose, where the measurement reporting may potentially be triggered in the same/similar conditions.

MDT is primarily used for finding areas with bad coverage or other types of problems. In such situations the whole radio environment would need to be logged and that involves a lot of possible information to signal back to the system, including Received Signal Strength, RSS, from multiple cells of network nodes, Timing Advance/Round Trip Time, TA/RTT, from multiple cells, Doppler with regard to multiple cells, other radio related base band information like Power Delay Profiles, PDPs. PDPs gives the distribution of signal power received over a multipath channel as a function of propagation delays. PDPs also denote the envelope of the magnitude of the impulse response power of the radio channel.

This information is useful in order generalise the decision on whether the wireless device is in a known location. In one embodiment this decision could be made dependent on the wireless device i) being within a certain radius of a previous location and ii) measuring radio related conditions that are "similar" to the ones stored for said previous location, where the similarity is e.g. evaluated by comparison in suitable norms. In case the conditions i) and ii) are valid (for a subset of radio related measurements) the wireless device would not need to perform another location measurement, and it would not need to report the radio related measurements. Just reporting the last known location or a measurement identity would be enough. Apart from reducing the wireless device procedures signalling resources would be saved. Further savings would be to perform reporting of delta-information or other versions of more compact reporting.

The degree of similarity may also be wireless device dependant or may be determined by the standard or may perhaps be even controlled by the network (e.g. the network signal conditions that determine the similarity). Similar measurements may not need to be reported or logged or may be logged/reported in a shorter format. Further, if with some time periodicity the obtained measurements are too similar, the periodicity may be further increased.

A new modified RRC procedure, shown in FIG. 6, is used to report measurement result. This reduces largely the number of signalling messages used in prior art in order to report measurements result.

The wireless device may indicate to another node that it has recognised the location or determined a similarity, wherein the indication may be implicit or explicit. (Another option is to not report, as described in some embodiments above).

In one example, the wireless device may report 'same location as before' or may report a name of the known location e.g. 'office1' 'office2', home, thereby informing the network about its actual location without explicitly calculating any location. For that purpose the wireless device calculates its location based on historical events or periodically or whenever it receives a particular event. With each such location triggering, if the wireless device considers itself in one known location then as long as the wireless device is located in that known location, for any new location request the wireless device does not calculate any new location but rather it sends a short format e.g. 'office1'.

An objective of this action is to use a short format to report or log the recognised previously reported location without calculating any new location. The report may be based on information that the wireless device is again at one of the already reported 'known locations'. The short format may comprise, e.g. a reference to an earlier reported location (e.g. same as in the last report or same as in the second last report) or a descriptive indicator of the location (e.g. 'home', 'office1', etc.).

Note that in order to differentiate 'home' of wireless device 1 from 'home' of another wireless device 2, another entity should be used. Such entity might be the IMSI or the IMEISV (IMEI Software Version) of that wireless device or it might be a tag agreed between the wireless device and the entity, e.g. a server, where the locations of the wireless devices are interpreted.

It may be pre-defined or configurable (e.g. by application or by a network node) whether the short format may be used.

The ability of the wireless device to use the short format may be a wireless device capability, which may also be signalled to another node (e.g. to eNB, MDT node or positioning node).

Figure 7:
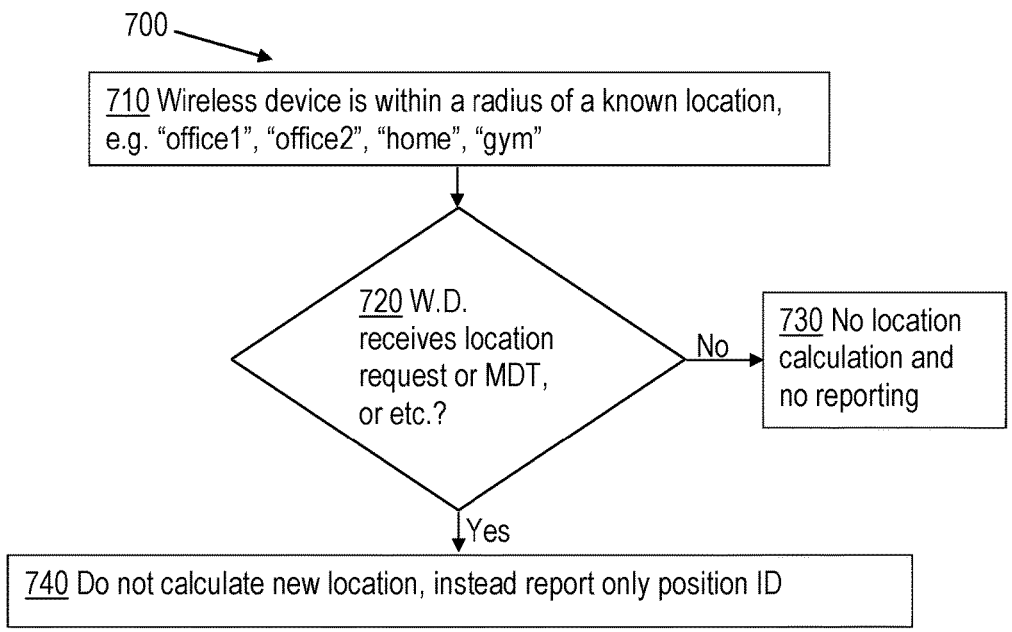
FIG. 7 is a flowchart of exemplifying actions for compact reporting.

The wireless device may be selectively using or not the short format also based on the capability of the receiving node (the node may also indicate to the wireless device its capability to understand short formats). A flowchart of an example of such a method is schematically illustrated in FIG. 7.

It should be noted that above features are not only used in case of MDT but would apply also in any procedure where the wireless device location is continuously requested. Apparently, main benefits are to extend wireless device battery, e.g. by switching off the UE, and also to reduce wireless device processing e.g. by avoiding triggering any new location procedure whenever the wireless device is in the area of 'last reported location'. However it should be noted that in some occasions or applications, the above features, would reduce the signalling exchanged in the network that are used in order to calculate the wireless device location in case of the absence of GPS. In fact there might be some applications or procedures that request a continuous location reporting of a particular wireless device e.g. an authority is tracking someone or two friends or relatives are updating their location via an application. In such scenarios with the absence of GPS and in order to locate the wireless device with a certain level of accuracy (not at the cell level) the wireless device and the network should exchange some parameter e.g. timing advance or the timing difference between a neighbour cell j and serving cell i. In other words the wireless device needs to be in connected mode in order to exchange the different parameters that are used in some location methods e.g. OTDOA or others.

As a result:
If the wireless device is already in connected mode, then depending on the location method that is used, all parameters are exchanged and the wireless device location is calculated.
However if the wireless device was in idle mode at the time of the location request, then the wireless device needs to trigger a 'temporary' signalling procedure in order to get the wireless device location with a certain degree of accuracy. In one embodiment, depending on whether it is an MO or an MT location procedure, one of the two signalling procedures is used see FIGS. 8a and 8b.

In another example a 'modified forced Tracking Area Update, TAU, procedure is triggered. The messages exchanged in that procedure are shown in FIG. 8a.

Again during that 'modified forced TAU' particularly used to for wireless device location, any location information exchange done via RRC messages, e.g. type of measurements to be done by the wireless device and any related information to be reported by the UE, might be omitted.

In yet another embodiment, if the wireless device is within the area of last reported location, with the absence of GPS, the wireless device does not have to trigger any prior art procedure, nor has to trigger any 'modified forced TAU' procedure rather a new modified RRC procedure might be used for that purpose. It works as follows:

As a result of this 'modified RRC procedure' used for the last reported wireless device location the benefit is very relevant. It consists of avoiding exchanging all signalling messages shown FIG. 8a in case the wireless device is in the area of the last reported location.

If the wireless device is within the area of the last reported location, the wireless device just sends an RRC_ConnectionRequest with a new EstablishmentCause 'last reported location'. To that message on one hand the eNB replies to the wireless device with RRC_ConnectionReject message in order to terminate this modified RRC procedure at this stage, and on the other hand it forwards to another entity, e.g. the OSS (Operations Support Systems) or eSMLC or others, the information that the reporting IMSI (that is related to the tracked UE) is in the same area of the last reported location. The OSS may store this information in its database then any entity e.g. Location Service Client, LCS, or any other application that is requesting the wireless device location might continuously consult that new OSS database in order to find the updated location of the wireless device in case one of its request procedure was not terminated as in prior art e.g. by completing all signalling messages in FIG. 8a or 8b (case of the modified force TAU).

FIG. 8b is a signalling diagram illustrating Evolved packet Core Mobile Originated Location Request.

In case of MDT, the wireless device may store, beside the radio event that requires a location, information stating 'same as last reported location' with a timestamp. This should have the same timestamp as the location reported in the OSS new database.

By using the new 'modified RRC procedure' as shown in FIG. 10, the wireless device informs the eNB about its last location. However that location should be transferred to the right entity. Different methods could be used. In one embodiment the eNB just forwards to the OSS, a new notification, denoted in this disclosure as 'Last reported location'. Once the location is at OSS it could be then forwarded to an external server or to an email address or to LCS or any other entity.

The Adaptive Enhanced Cell ID, AECID, is a positioning method for GSM, WCDMA, and for LTE. That method characterises the radio measurements at a certain location by means of a "tag" or "fingerprint". This fingerprint is essentially a coarsely quantised version of the radio related measurements, jointly encoded. In case the AECID method is deployed, there is hence a format available for reporting of the radio related measurements. This format is compact and may be retrieved from the configuration data of the positioning node.

In this example, at least parts of the reporting of the MDT measurements associated with the MDT position are signalled with the AECID format. This i) saves signalling bandwidth and ii) enables a direct reuse of MDT measurements for population of the AECID database. This in turn may enhance the accuracy of the AECID positioning method.

Embodiments herein also relate to a wireless device for reporting and logging an event, the wireless device being operable in a wireless communication network.

Embodiments of such a wireless device will now be described with reference to FIGS. 11 and 12, which are block diagrams of embodiments of such a wireless device. The wireless device has the same technical features, objects and advantages as the method performed by the wireless device. The wireless device will only be described in brief in order to avoid unnecessary repetition.

Figure 11:
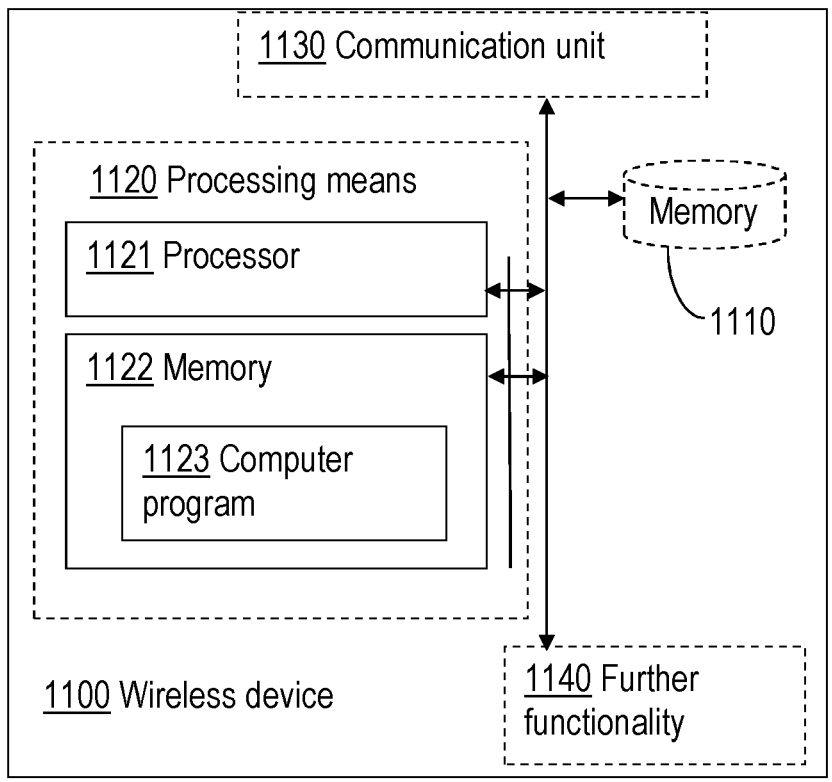
FIG. 11 is a block diagram of a wireless device for reporting and logging an event, according to an exemplifying embodiment.
Figure 12:
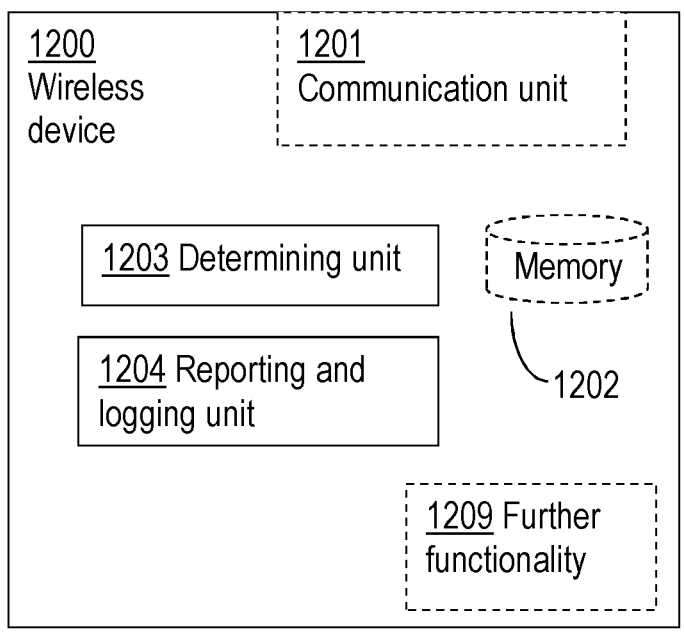
FIG. 12 is a block diagram of a wireless device for reporting and logging an event, according to yet an exemplifying embodiment.

FIGS. 11 and 12 illustrate the wireless device 1100, 1200 being configured for determining that an event is to be logged and/or reported; and determining if the location of the wireless device is a known location or is the same location as the last time the event was logged and/or reported. The wireless device 1100, 1200 is further configured for, when the location of the wireless device is a known location or the same location as the last time the event was logged and/or reported, reporting and logging to a network node according to an enhanced reporting and logging functionality.

The wireless device 1100, 1200 may be realised or implemented in various different ways. A first exemplifying implementation is illustrated in FIG. 11. FIG. 11 illustrates the wireless device 1100 comprising a processor 1121 and memory 1122, the memory comprising instructions, e.g. by means of a computer program 1123, which when executed by the processor 1121 causes the wireless device 1100 to determine that an event is to be logged and/or reported; and to determine if the location of the wireless device is a known location or is the same location as the last time the event was logged and/or reported. The memory 1122 further comprises instructions, which when executed by the processor 1121 causes the wireless device 1100 to, when the location of the wireless device is a known location or the same location as the last time the event was logged and/or reported, reporting and logging to a network node according to an enhanced reporting and logging functionality.

FIG. 11 also illustrates the wireless device 1100 comprising a memory 1110. It shall be pointed out that FIG. 11 is merely an exemplifying illustration and memory 1110 may be optional, be a part of the memory 1122 or be a further memory of the wireless device 1100. The memory may for example comprise information relating to the wireless device 1100, to statistics of operation of the wireless device 1100, just to give a couple of illustrating examples. FIG. 11 further illustrates the wireless device 1100 comprising processing means 1120, which comprises the memory 1122 and the processor 1121. Still further, FIG. 11 illustrates the wireless device 1100 comprising a communication unit 1130. The communication unit 1130 may comprise an interface through which the wireless device 1100 communicates with other nodes or entities of the communication network. FIG. 11 also illustrates the wireless device 1100 comprising further functionality 1140. The further functionality 1140 may comprise hardware of software necessary for the wireless device 1100 to perform different tasks that are not disclosed herein.

An alternative exemplifying implementation of the wireless device 1100, 1200 is illustrated in FIG. 12. FIG. 12 illustrates the wireless device 1200 comprising a determining unit 1103 for determining that an event is to be logged and/or reported; and determining if the location of the wireless device is a known location or is the same location as the last time the event was logged and/or reported. The wireless device 1200 further comprises a reporting and logging unit 1104 for reporting and logging to a network node according to an enhanced reporting and logging functionality when the location of the wireless device is a known location or the same location as the last time the event was logged and/or reported.

In FIG. 12, the wireless device 1200 is also illustrated comprising a communication unit 1201. Through this unit, the wireless device 1200 is adapted to communicate with other nodes and/or entities in the wireless communication network. The communication unit 1201 may comprise more than one receiving arrangement. For example, the communication unit 1201 may be connected to both a wire and an antenna, by means of which the wireless device 1200 is enabled to communicate with other nodes and/or entities in the wireless communication network. Similarly, the communication unit 1201 may comprise more than one transmitting arrangement, which in turn is connected to both a wire and an antenna, by means of which the wireless device 1200 is enabled to communicate with other nodes and/or entities in the wireless communication network. The wireless device 1200 further comprises a memory 1202 for storing data. Further, the wireless device 1200 may comprise a control or processing unit (not shown) which in turn is connected to the different units 1203-1204. It shall be pointed out that this is merely an illustrative example and the wireless device 1200 may comprise more, less or other units or modules which execute the functions of the wireless device 1200 in the same manner as the units illustrated in FIG. 12.

It should be noted that FIG. 12 merely illustrates various functional units in the wireless device 1200 in a logical sense. The functions in practice may be implemented using any suitable software and hardware means/circuits etc. Thus, the embodiments are generally not limited to the shown structures of the wireless device 1200 and the functional units. Hence, the previously described exemplary embodiments may be realised in many ways. For example, one embodiment includes a computer-readable medium having instructions stored thereon that are executable by the control or processing unit for executing the method steps in the wireless device 1200. The instructions executable by the computing system and stored on the computer-readable medium perform the method steps of the wireless device 1200 as set forth in the claims.

The wireless device has the same possible advantages as the method performed by the wireless device. One possible advantage is that the battery life of the wireless device may be extended e.g. by not performing radio related measurements while residing at a known location or at the same location as the last time the event was logged and/or reported. In case the wireless device is in a known location, a GPS application of the wireless device may be switched off possible further extending battery life of the wireless device. By not performing any location reporting or reduced reporting according to the enhanced reporting and logging functionality in case the wireless device is still in the same location as previous reported one or a known location, the battery life of the wireless device may be further extended. Another possible advantage is that the signalling exchange in the network may be reduced. Yet a possible advantage is that establishing a temporary signalling channel used in order to exchange all messages in different signalling procedures used between UE & network may be avoided, due to the enhanced reporting and logging functionality. Still a possible advantage is that storage requirements in the node administrating MDT data may be reduced, again due to the enhanced reporting and logging functionality.

According to an embodiment, the enhanced reporting and logging functionality comprises reporting and/or logging according to a short format; retrieving and reporting the same information as previously reported for the location of the wireless device without performing any new measurements and/or positioning; or refraining from reporting and/or logging the determined event.

According to another embodiment, the short format is at least one of a measurement ID or position ID for of a previously reported measurement or position.

According to yet an embodiment, when the location of the wireless device is not a known location or is not the same location as the last time the event was logged and/or reported, the wireless device 1100, 1200 is configured for determining the location of the wireless device, transmitting the location of the device to the network node, and storing the location of the wireless device.

According to still an embodiment, the wireless device 1100, 1200 is further configured for performing a measurement with regard to at least radio conditions at the location of the wireless device, transmitting the measurement to the network node and storing the measurements relating to the location of the wireless device.

According to a further embodiment, when the location of the wireless device is not a known location but is the same location as the last time the event was logged and/or reported, the wireless device 1100, 1200 further is configured for determining the time passed between when the event was logged and/or reported and current time, and when the time passed is longer than a predetermined time threshold, storing the location of the wireless device as a known location.

According to yet an embodiment, the wireless device 1100, 1200 is further configured for associating the known location with a position ID such as "office1", office2", "home", "gym" and transmitting the position ID to the network node together with the real geographical location, wherein when a subsequent event is to be logged and/or reported and the wireless device is in this now known location, only the position ID for this location is sent to the network node.

According to still an embodiment, the wireless device 1100, 1200 is configured for determining if the location of the wireless device is a known location or is the same location as the last time the event was logged and/or reported by determining a deviation of the current location from a known location or the same location as the last time the event was logged and/or reported, wherein the wireless device is determined to be in a known location or the same location as the last time the event was logged and/or reported when the deviation is below a predetermined distance threshold.

According to another embodiment, reporting a known location or the same location as the last time the event was logged and/or reported to the network node is performed by means of RRC signalling.

According to a further embodiment, the RRC signalling is the result of a RRC procedure wherein no additional signalling channel needs to be allocated for the RRC signalling.

According to yet an embodiment, the wireless device 1100, 1200 is further configured for receiving, from the network node, a request relating to a MDT configuration or request comprising an indication whether location of the wireless device is required, wherein when the location of the wireless device is required, the wireless device is configured for determining the location and (i) when the location is not a known location or the last reported location: performing a radio measurement and reporting the location and radio measurement to the network node, (ii) when the location is a known location or the last reported location: reporting and logging to the network node according to the enhanced reporting and logging functionality.

Embodiments herein also relate to a network node for reporting and logging of an event associated with a wireless device, the wireless device and the network node being operable in a wireless communication network.

Embodiments of such a network node will now be described with reference to FIGS. 13 and 14, which are block diagrams of embodiments of such a network node. The network node has the same technical features, objects and advantages as the method performed by the network node. The network node will only be described in brief in order to avoid unnecessary repetition.

Figure 13:
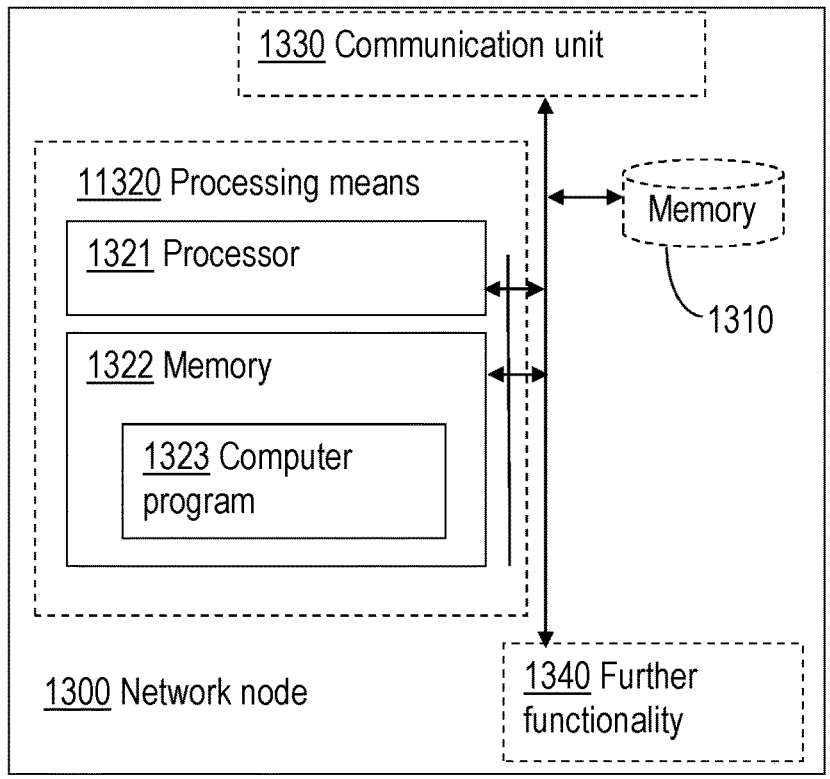
FIG. 13 is a block diagram of a network node for reporting and logging of an event associated with a wireless device, according to an exemplifying embodiment.
Figure 14:
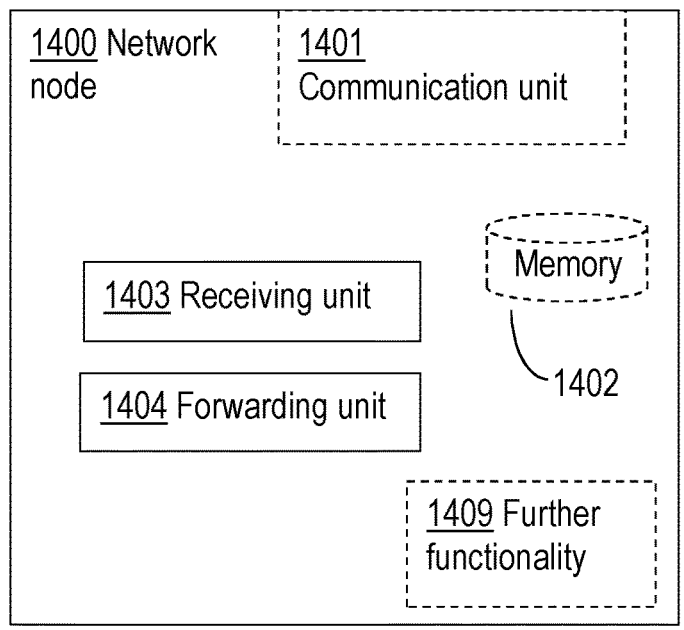
FIG. 14 is a block diagram of a network node for reporting and logging of an event associated with a wireless device, according to still an exemplifying embodiment.

FIGS. 13 and 14 illustrate the network node 1300, 1400 being configured for receiving, from the wireless device, a report of the event according to an enhanced reporting and logging functionality; and forwarding the received report to an OSS or an eSMLC.

The network node 1300, 1400 may be realised or implemented in various different ways. A first exemplifying implementation is illustrated in FIG. 13. FIG. 13 illustrates the network node 1300 comprising a processor 1321 and memory 1322, the memory comprising instructions, e.g. by means of a computer program 1323, which when executed by the processor 1321 causes the network node 1300 to receive, from the wireless device, a report of the event according to an enhanced reporting and logging functionality; and to forward the received report to an OSS or an eSMLC.

FIG. 13 also illustrates the network node 1300 comprising a memory 1310. It shall be pointed out that FIG. 13 is merely an exemplifying illustration and memory 1310 may be optional, be a part of the memory 1322 or be a further memory of the network node. The memory may for example comprise information relating to the network node 1300, to statistics of operation of the network node 1300, just to give a couple of illustrating examples. FIG. 13 further illustrates the network node 1300 comprising processing means 1320, which comprises the memory 1322 and the processor 1321. Still further, FIG. 13 illustrates the network node 1300 comprising a communication unit 1330. The communication unit 1330 may comprise an interface through which the network node 1300 communicates with other nodes or entities of the communication network as well as wireless devices of the communication network. FIG. 13 also illustrates the network node 1300 comprising further functionality 1340. The further functionality 1340 may comprise hardware of software necessary for the network node 1300 to perform different tasks that are not disclosed herein. Merely as an illustrative example, the further functionality may comprise a scheduler for scheduling transmissions from the network node 1300 and/or for transmissions from wireless devices with which the network node 1300 communicates with.

An alternative exemplifying implementation of the network node 1300, 1400 is illustrated in FIG. 14. FIG. 14 illustrates the network node 1400 comprising a receiving unit 1403 for receiving, from the wireless device, a report of the event according to an enhanced reporting and logging functionality; and a forwarding unit 1404 for forwarding the received report to an OSS or an eSMLC.

In FIG. 14, the network node 1400 is also illustrated comprising a communication unit 1401. Through this unit, the network node 1400 is adapted to communicate with other nodes and/or entities in the wireless communication network. The communication unit 1401 may comprise more than one receiving arrangement. For example, the communication unit 1401 may be connected to both a wire and an antenna, by means of which the network node 1400 is enabled to communicate with other nodes and/or entities in the wireless communication network. Similarly, the communication unit 1401 may comprise more than one transmitting arrangement, which in turn is connected to both a wire and an antenna, by means of which the network node 1400 is enabled to communicate with other nodes and/or entities in the wireless communication network. The network node 1400 further comprises a memory 1402 for storing data. Further, the network node 1400 may comprise a control or processing unit (not shown) which in turn is connected to the different units 1403-1404. It shall be pointed out that this is merely an illustrative example and the network node 1400 may comprise more, less or other units or modules which execute the functions of the network node 1400 in the same manner as the units illustrated in FIG. 14.

It should be noted that FIG. 14 merely illustrates various functional units in the network node 1400 in a logical sense. The functions in practice may be implemented using any suitable software and hardware means/circuits etc. Thus, the embodiments are generally not limited to the shown structures of the network node 1400 and the functional units. Hence, the previously described exemplary embodiments may be realised in many ways. For example, one embodiment includes a computer-readable medium having instructions stored thereon that are executable by the control or processing unit for executing the method steps in the network node 1400. The instructions executable by the computing system and stored on the computer-readable medium perform the method steps of the network node 1400 as set forth in the claims.

The network node has the same possible advantages as the method performed by the network node. One possible advantage is that the battery life of the wireless device may be extended e.g. by not performing radio related measurements while residing at a known location or at the same location as the last time the event was logged and/or reported. In case the wireless device is in a known location, a GPS application of the wireless device may be switched off possible further extending battery life of the wireless device. By not performing any location reporting or reduced reporting according to the enhanced reporting and logging functionality in case the wireless device is still in the same location as previous reported one or a known location, the battery life of the wireless device may be further extended. Another possible advantage is that the signalling exchange in the network may be reduced. Yet a possible advantage is that establishing a temporary signalling channel used in order to exchange all messages in different signalling procedures used between UE & network may be avoided, due to the enhanced reporting and logging functionality. Still a possible advantage is that storage requirements in the node administrating MDT data may be reduced, again due to the enhanced reporting and logging functionality.

According to an embodiment, the network node 1300, 1400 is further configured for receiving, from the wireless device, capability information of the wireless device indicating that the wireless device supports enhanced reporting and logging functionality.

According to still an embodiment, the report of the event is received by means of RRC signalling.

According to a further embodiment, the RRC signalling is the result of a RRC procedure wherein no additional signalling channel needs to be allocated for the RRC signalling.

According to yet an embodiment, when the network node 1300, 1400 forwards the received report to the eSMLC, the network node does so by means of a Long Term Evolution Positioning Protocol A, LPPa.

According to an embodiment, the network node 1300, 1400 is further configured for receiving, from the wireless device, position IDs associated with known locations such as "office1", office2", "home", "gym", wherein the report of the event according to the enhanced reporting and logging functionality comprises the position ID of the known location the wireless is in when the event was triggered.

Figure 15:
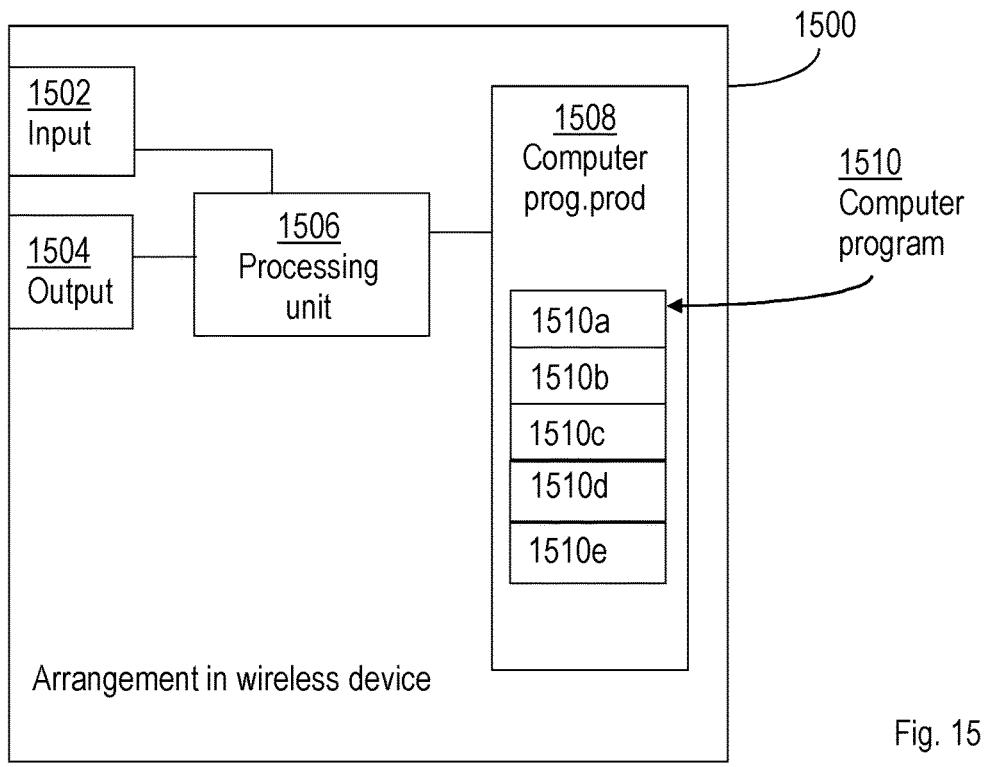
FIG. 15 is a block diagram of an arrangement in a wireless device for reporting and logging an event, according to an exemplifying embodiment.

FIG. 15 schematically shows an embodiment of an arrangement 1500 in a wireless device. Comprised in the arrangement 1500 in the wireless device are here a processing unit 1506, e.g. with a Digital Signal Processor, DSP. The processing unit 1506 may be a single unit or a plurality of units to perform different actions of procedures described herein. The arrangement 1500 in the wireless device may also comprise an input unit 1502 for receiving signals from other entities, and an output unit 1504 for providing signal(s) to other entities. The input unit and the output unit may be arranged as an integrated entity or as illustrated in the example of FIG. 12, as one or more interfaces 1201.

Furthermore, the arrangement 1500 in the wireless device comprises at least one computer program product 1508 in the form of a non-volatile memory, e.g. an Electrically Erasable Programmable Read-Only Memory, EEPROM, a flash memory and a hard drive. The computer program product 1508 comprises a computer program 1510, which comprises code means, which when executed in the processing unit 3206 in the arrangement 1500 in the wireless device causes the wireless device to perform the actions e.g. of the procedure described earlier in conjunction with FIGS. 1*a*-1*g*.

The computer program 1510 may be configured as a computer program code structured in computer program modules 1510*a*-1510*e*. Hence, in an exemplifying embodiment, the code means in the computer program of the arrangement 1500 in the wireless device comprises a determining unit, or module, for determining that an event is to be logged and/or reported; and determining if the location of the wireless device is a known location or is the same location as the last time the event was logged and/or reported. The computer program further comprises a reporting and logging unit, or module, for reporting and logging to a network node according to an enhanced reporting and logging functionality when the location of the wireless device is a known location or the same location as the last time the event was logged and/or reported.

The computer program modules could essentially perform the actions of the flow illustrated in FIGS. 1*a*-1*g*, to emulate the wireless device 1200. In other words, when the different computer program modules are executed in the processing unit 1506, they may correspond to the units 1203-1204 of FIG. 12.

Figure 16:
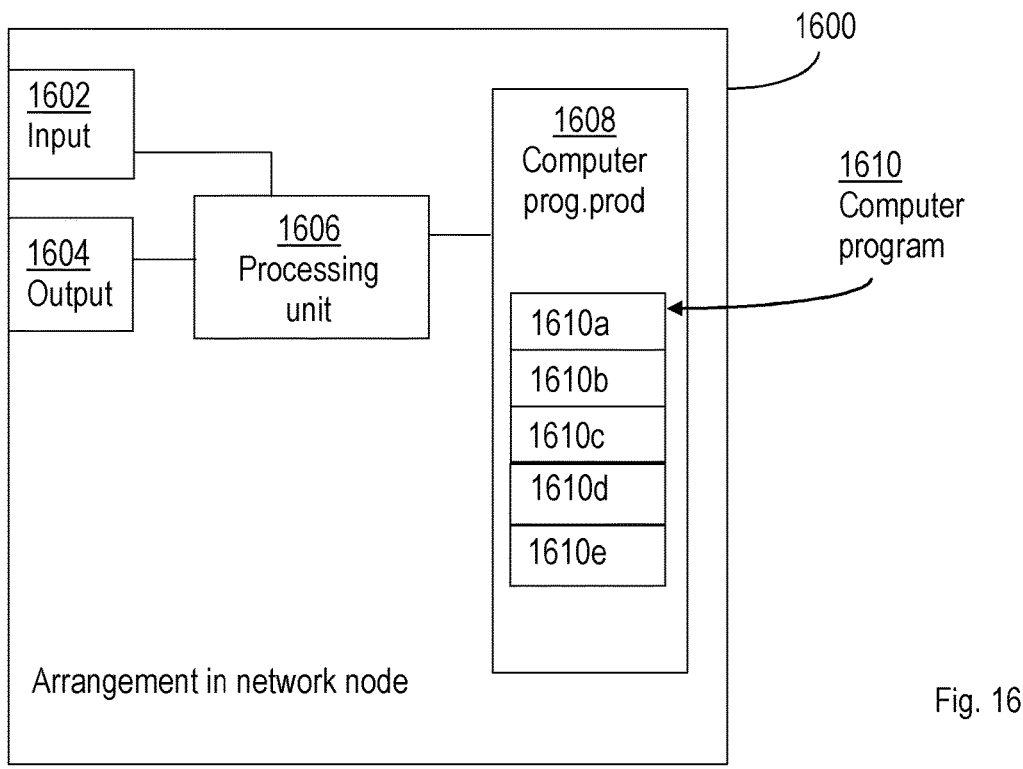
FIG. 16 is a block diagram of an arrangement in a network node for reporting and logging of an event associated with a wireless device, according to an exemplifying embodiment.

FIG. 16 schematically shows an embodiment of an arrangement 1600 in a network node. Comprised in the arrangement 1600 in the network node are here a processing unit 1606, e.g. DSP. The processing unit 1606 may be a single unit or a plurality of units to perform different actions of procedures described herein. The arrangement 1600 in the network node may also comprise an input unit 1602 for receiving signals from other entities, and an output unit 1604 for providing signal(s) to other entities. The input unit and the output unit may be arranged as an integrated entity or as illustrated in the example of FIG. 14, as one or more interfaces 1401.

Furthermore, the arrangement 1600 in the network node comprises at least one computer program product 1608 in the form of a non-volatile memory, e.g. an EEPROM, a flash memory and a hard drive. The computer program product 1608 comprises a computer program 1610, which comprises code means, which when executed in the processing unit 1606 in the arrangement 1600 in the network node causes the network node to perform the actions e.g. of the procedure described earlier in conjunction with FIGS. 2*a*-2?*c*.

The computer program 1610 may be configured as a computer program code structured in computer program modules 1610*a*-1610*e*. Hence, in an exemplifying embodiment, the code means in the computer program of the arrangement 1600 in the network node comprises a receiving unit, or module, for receiving, from the wireless device, a report of the event according to an enhanced reporting and logging functionality. The computer program further comprises a forwarding unit, or module, for forwarding the received report to an OSS or an eSMLC.

The computer program modules could essentially perform the actions of the flow illustrated in 2*a*-2*c*, to emulate the wireless device 1400. In other words, when the different computer program modules are executed in the processing unit 1606, they may correspond to the units 1403-1404 of FIG. 14.

Although the code means in the respective embodiments disclosed above in conjunction with FIGS. 12 and 14 are implemented as computer program modules which when executed in the respective processing unit causes the wireless device and the network node respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the wireless device and the network node respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, performed by a wireless device, for reporting and logging an event, the wireless device being operable in a wireless communication network, the method comprising:
 determining that an event is to be logged and/or reported;
 determining whether a current location of the wireless device is a known location or is a same location, wherein the known location is a location that the wireless device re-visits regularly, and wherein the same location is a location from which the wireless device logged and/or reported the event last time;
 responsive to the current location of the wireless device being the known location or the same location as the last time the event was logged and/or reported, logging and reporting to a network node according to an enhanced reporting and logging functionality, and
 responsive to the current location of the wireless device not being the known location but being the same location as the last time the event was logged and/or reported:
  determining a time passed between when the event was logged and/or reported and current time; and
  when the time passed is longer than a predetermined time threshold, storing the same location of the wireless device as the known location.

2. The method of claim 1, wherein the enhanced reporting and logging functionality comprises at least one of:
 reporting and/or logging according to a short format;
 retrieving and reporting the same information as previously reported for the location of the wireless device without performing any new measurements and/or positioning;
 refraining from reporting and/or logging the determined event.

3. The method of claim 2, wherein the short format is at least one of a measurement ID or position ID for of a previously reported measurement or position.

4. The method of claim 1, further comprising, when the current location of the wireless device is not the known location or is not the same location as the last time the event was logged and/or reported:
 determining the current location of the wireless device;
 transmitting the current location of the device to the network node; and
 storing the current location of the wireless device.

5. The method of claim 4, further comprising:
 performing a measurement with regard to at least radio conditions at the current location of the wireless device;
 transmitting the measurement to the network node; and
 storing the measurement relating to the current location of the wireless device.

6. The method of claim 1:
 further comprising associating the known location with a position ID and transmitting the position ID to the network node together with the real geographical location;
 wherein, when a subsequent event is to be logged and/or reported and the wireless device is in this now known location, only the position ID for this location is sent to the network node.

7. The method of claim 1, wherein determining if the current location of the wireless device is the known location or is the same location as the last time the event was logged and/or reported comprises:
 determining a deviation of the current location from the known location or the same location as the last time the event was logged and/or reported;
 wherein the wireless device is determined to be in a known location or the same location as the last time the event was logged and/or reported when the deviation is below a predetermined distance threshold.

8. The method of claim 1, wherein reporting a known location or the same location as the last time the event was logged and/or reported to the network node is performed by means of Radio Resource Control (RRC) signaling.

9. The method of claim 8, wherein the RRC signaling is a result of a RRC procedure wherein no additional signaling channel needs to be allocated for the RRC signaling.

10. The method of claim 1, further comprising:
 receiving, from the network node, a request relating to a Minimization of Drive Tests (MDT) configuration or request comprising an indication whether current location of the wireless device is required;
 when the current location of the wireless device is required:
  determining the current location;
  when the current location is not a known location or the last reported location, performing a radio measurement and reporting the current location and radio measurement to the network node;
  when the current location is a known location or the last reported location, logging and reporting to the network node according to the enhanced reporting and logging functionality.

11. A method, performed by a network node, for reporting and logging of an event associated with a wireless device, the wireless device and the network node being operable in a wireless communication network, the method comprising:
 receiving, from the wireless device, a report of the event according to an enhanced reporting and logging functionality;
 receiving, from the wireless device, position IDs associated with known locations, wherein the received report of the event according to the enhanced reporting and logging functionality comprises the position ID of the known location the wireless device is in when the event was triggered; and
 forwarding the received report to an Operations Support System (OSS) or an evolved Serving Mobile Location Center (eSMLC).

12. The method of claim 11, further comprising receiving, from the wireless device, capability information of the wireless device indicating that the wireless device supports enhanced reporting and logging functionality.

13. The method of claim 11, wherein the report of the event is received by means of Radio Resource Control (RRC) signaling.

14. The method of claim 13, wherein the RRC signaling is the result of a RRC procedure wherein no additional signaling channel needs to be allocated for the RRC signaling.

15. The method of claim 11, wherein, when the network node forwards the received report to the eSMLC, the network node does so by means of a Long Term Evolution Positioning Protocol A.

16. The method of claim 11, wherein, when the network node forwards the received report to the eSMLC, the network node does so by means of a Long Term Evolution Positioning Protocol A.

17. A wireless device for reporting and logging an event, the wireless device being operable in a wireless communication network, the wireless device comprising:
 processing circuitry;

memory containing instructions executable by the processing circuitry whereby the wireless device is operative to:
  determine that an event is to be logged and/or reported;
  determining whether a current location of the wireless device is a known location or is a same location, wherein the known location is a location that the wireless device re-visits regularly, and wherein the same location is a location from which the wireless device logged and/or reported the event last time;
  responsive to the current location of the wireless device being the known location or the same location as the last time the event was logged and/or reported, logging and reporting to a network node according to an enhanced reporting and logging functionality; and
  responsive to the current location of the wireless device not being the known location but being the same location as the last time the event was logged and/or reported:
    determining a time passed between when the event was logged and/or reported and current time; and
    when the time passed is longer than a predetermined time threshold, storing the same location of the wireless device as the known location.

18. The wireless device of claim 17, wherein the enhanced reporting and logging functionality comprises at least one of:
  reporting and/or logging according to a short format;
  retrieving and reporting the same information as previously reported for the location of the wireless device without performing any new measurements and/or positioning;
  refraining from reporting and/or logging the determined event.

19. The wireless device of claim 18, wherein the short format is at least one of a measurement ID or position ID for of a previously reported measurement or position.

20. The wireless device of claim 17, wherein the instructions are such that the wireless device is operative to, when the current location of the wireless device is not a known location or is not the same location as the last time the event was logged and/or reported:
  determine the current location of the wireless device;
  transmit the current location of the device to the network node; and
  store the current location of the wireless device.

21. The wireless device of claim 20, wherein the instructions are such that the wireless device is operative to:
  perform a measurement with regard to at least radio conditions at the current location of the wireless device;
  transmit the measurement to the network node; and
  store the measurements relating to the current location of the wireless device.

22. The wireless device of claim 17, wherein the instructions are such that the wireless device is operative to:
  associate the known location with a position ID and transmit the position ID to the network node together with the real geographic location;
  when a subsequent event is to be logged and/or reported and the wireless device is in this now known location, only the position ID for this location is sent to the network node.

23. The wireless device of claim 17, wherein the instructions are such that the wireless device is operative to determine if the current location of the wireless device is the known location or is the same location as the last time the event was logged and/or reported by:
  determining a deviation of the current location from a known location or the same location as the last time the event was logged and/or reported;
  wherein the wireless device is determined to be in the known location or the same location as the last time the event was logged and/or reported when the deviation is below a predetermined distance threshold.

24. The wireless device of claim 17, wherein reporting a known location or the same location as the last time the event was logged and/or reported to the network node is performed by means of Radio Resource Control (RRC) signaling.

25. The wireless device of claim 24, wherein the RRC signaling is the result of a RRC procedure wherein no additional signaling channel needs to be allocated for the RRC signaling.

26. The wireless device of claim 17, wherein the instructions are such that the wireless device is operative to:
  receive, from the network node, a request relating to a Minimization of Drive Tests, MDT, configuration or request comprising an indication whether location of the wireless device is required;
  when the current location of the wireless device is required:
    determine the current location;
    when the current location is not a known location or the last reported location, perform a radio measurement and report the location and radio measurement to the network node;
    when the current location is a known location or the last reported location, report and log to the network node according to the enhanced reporting and logging functionality.

27. A network node for reporting and logging of an event associated with a wireless device, the wireless device and the network node being operable in a wireless communication network, the network node comprising:
  processing circuitry;
  memory containing instructions executable by the processing circuitry whereby the network node is operative to:
    receive, from the wireless device, a report of the event according to an enhanced reporting and logging functionality;
    receive, from the wireless device, position IDs associated with known locations, wherein the received report of the event according to the enhanced reporting and logging functionality comprises the position ID of the known location the wireless is in when the event was triggered; and
    forward the received report to an Operations Support System (OSS) or an evolved Serving Mobile Location Center (eSMLC).

28. The network node of claim 27, wherein the instructions are such that the network node is operative to receive, from the wireless device, capability information of the wireless device indicating that the wireless device supports enhanced reporting and logging functionality.

29. The network node of claim 27, wherein the report of the event is received by means of Radio Resource Control (RRC) signaling.

30. The network node of claim 29, wherein the RRC signaling is the result of a RRC procedure wherein no additional signaling channel needs to be allocated for the RRC signaling.

31. A non-transitory computer readable recording medium storing a computer program product for reporting and logging an event by a wireless device operable in a wireless communication network, the computer program product comprising software instructions which, when run on processing circuitry of the wireless device, causes the wireless device to:
- determine that an event is to be logged and/or reported;
  - determine whether a current location of the wireless device is a known location or is a same location, wherein the known location is a location that the wireless device re-visits regularly, and wherein the same location is a location from which the wireless device logged and/or reported the event last time;
  - responsive to the current location of the wireless device being the known location or the same location as the last time the event was logged and/or reported, logging and reporting to a network node according to an enhanced reporting and logging functionality; and
  - responsive to the current location of the wireless device not being the known location but being the same location as the last time the event was logged and/or reported:
    - determine a time passed between when the event was logged and/or reported and current time; and
    - when the time passed is longer than a predetermined time threshold, storing the same location of the wireless device as the known location.

32. A non-transitory computer readable recording medium storing a computer program product for reporting and logging of an event associated with a wireless device, the wireless device and a network node being operable in a wireless communication network, the computer program product comprising software instructions which, when run on processing circuitry of the network node, causes the network node to:
- receive, from the wireless device, a report of the event according to an enhanced reporting and logging functionality;
- receive, from the wireless device, position IDs associated with known locations, wherein the received report of the event according to the enhanced reporting and logging functionality comprises the position ID of the known location the wireless is in when the event was triggered; and
- forward the received report to an Operations Support System (OSS) or an evolved Serving Mobile Location Center (eSMLC).

* * * * *